US008538840B2

(12) United States Patent
Chan et al.

(10) Patent No.: US 8,538,840 B2
(45) Date of Patent: Sep. 17, 2013

(54) FINANCIAL SERVICES DATA MODEL

(75) Inventors: Cynthia M. Chan, San Jose, CA (US);
Chiun-Feng Hsiao, Belmont, CA (US);
Hwee Har Yeap, San Mateo, CA (US);
Yi Yang, Foster City, CA (US); Lindy Hau-In Chan, Elk Grove, CA (US);
Jing Gu, Foster City, CA (US); Caroline Muralitharan, San Jose, CA (US);
Nardo B. Catahan, Jr., South San Francisco, CA (US); Blair Thomas Wheadon, San Francisco, CA (US);
Edward Ming Chao, Fremont, CA (US); Agnes Le Yuan Hong, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1361 days.

(21) Appl. No.: 10/434,533

(22) Filed: May 8, 2003

(65) Prior Publication Data
US 2007/0226093 A1 Sep. 27, 2007

Related U.S. Application Data

(60) Provisional application No. 60/435,461, filed on Dec. 20, 2002.

(51) Int. Cl.
*G06Q 40/00* (2012.01)
(52) U.S. Cl.
USPC .............................................. 705/35; 705/36
(58) Field of Classification Search
USPC ...................................... 705/36, 35
See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A * | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |

(Continued)

FOREIGN PATENT DOCUMENTS

| | | |
|---|---|---|
| JP | 2001256308 | 9/2001 |
| WO | WO 0143031 | 6/2001 |
| WO | WO 01/88759 A1 | 11/2001 |
| WO | WO 03/003641 A2 | 1/2003 |

OTHER PUBLICATIONS

Bauer, Paul W; Cromwell, Brian A; "A Monte Carlo examination of bias tests in mortgage lending"; Economic Review; Third Q, 1994, ISSN: 0013-0281.*

(Continued)

*Primary Examiner* — Edward Chang
(74) *Attorney, Agent, or Firm* — Campbell Stephenson LLP

(57) ABSTRACT

A data model that allows for relationships between entities, also referred to as parties, to be modeled as attributes of an entity and for customization of the data model in a manner that facilitates upgrading of the data model. In some embodiments, the data model may facilitate creation and processing of financial applications. Using the data model, received application data can be stored in a financial application record, including data relating to a party's financial statements. In some embodiments, the data model may facilitate management of financial account data for multiple accounts. In some embodiments the data model may facilitate management of credit information, such as credit information collected by credit bureaus.

9 Claims, 48 Drawing Sheets

(56) References Cited

U.S. PATENT DOCUMENTS

| | | | |
|---|---|---|---|
| 5,446,880 A | 8/1995 | Balgeman et al. | 707/9 |
| 5,566,332 A | 10/1996 | Adair et al. | 707/101 |
| 5,646,862 A | 7/1997 | Jolliffe et al. | 703/1 |
| 5,699,527 A * | 12/1997 | Davidson | 705/38 |
| 5,708,828 A | 1/1998 | Coleman | 395/785 |
| 5,724,575 A | 3/1998 | Hoover et al. | 707/10 |
| 5,727,158 A | 3/1998 | Bouziane et al. | 709/225 |
| 5,742,588 A | 4/1998 | Thornberg et al. | 370/236 |
| 5,758,355 A | 5/1998 | Buchanan | 707/201 |
| 5,764,543 A | 6/1998 | Kennedy | 703/2 |
| 5,806,075 A | 9/1998 | Jain et al. | 707/201 |
| 5,930,156 A | 7/1999 | Kennedy | 703/6 |
| 5,930,764 A * | 7/1999 | Melchione et al. | 705/10 |
| 5,953,710 A * | 9/1999 | Fleming | 705/38 |
| 5,970,490 A | 10/1999 | Morgenstern | 707/10 |
| 5,983,194 A | 11/1999 | Hogge et al. | 705/7 |
| 6,032,136 A * | 2/2000 | Brake et al. | 705/41 |
| 6,053,947 A | 4/2000 | Parson | 703/14 |
| 6,167,380 A | 12/2000 | Kennedy et al. | 705/10 |
| 6,178,418 B1 | 1/2001 | Singer | 707/3 |
| 6,182,053 B1 | 1/2001 | Rauber et al. | 705/28 |
| 6,216,130 B1 | 4/2001 | Hougaard et al. | 707/10 |
| 6,226,649 B1 | 5/2001 | Bodamer et al. | 707/104.1 |
| 6,233,566 B1 * | 5/2001 | Levine et al. | 705/36 R |
| 6,236,997 B1 | 5/2001 | Bodamer et al. | 707/101 |
| 6,275,812 B1 | 8/2001 | Haq et al. | 705/11 |
| 6,336,124 B1 | 1/2002 | Alam et al. | 715/523 |
| 6,341,289 B1 | 1/2002 | Burroughs et al. | 707/104.1 |
| 6,343,275 B1 | 1/2002 | Wong | 705/26 |
| 6,377,952 B1 | 4/2002 | Inohara et al. | 707/101 |
| 6,385,620 B1 | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,569,207 B1 | 5/2003 | Sundaresan | 715/234 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,681,223 B1 | 1/2004 | Sundaresan | 707/6 |
| 6,738,975 B1 | 5/2004 | Yee et al. | 719/310 |
| 6,754,679 B2 | 6/2004 | Oheda | 707/201 |
| 6,778,651 B1 | 8/2004 | Jost et al. | 379/201.01 |
| 6,792,431 B2 | 9/2004 | Tamboli et al. | 707/102 |
| 6,826,542 B1 | 11/2004 | Virgin et al. | 705/34 |
| 6,826,568 B2 | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 | 5/2005 | Gupta et al. | 717/105 |
| 6,912,719 B2 | 6/2005 | Elderon et al. | 719/319 |
| 6,944,514 B1 | 9/2005 | Matheson | 700/98 |
| 6,947,947 B2 | 9/2005 | Block et al. | 707/102 |
| 6,961,760 B2 | 11/2005 | Li et al. | 709/219 |
| 6,996,776 B1 | 2/2006 | Makely et al. | 715/207 |
| 7,013,485 B2 | 3/2006 | Brown et al. | 726/27 |
| 7,043,687 B2 | 5/2006 | Knauss et al. | 715/513 |
| 7,062,540 B2 | 6/2006 | Reddy et al. | 709/217 |
| 7,065,499 B1 | 6/2006 | Seth et al. | 705/26 |
| 7,085,729 B1 | 8/2006 | Kennedy et al. | 705/10 |
| 7,093,200 B2 | 8/2006 | Schreiber et al. | 715/835 |
| 7,099,350 B2 | 8/2006 | Peterson | 370/465 |
| 7,111,010 B2 | 9/2006 | Chen | 707/102 |
| 7,111,077 B1 | 9/2006 | Starkovich et al. | 709/246 |
| 7,124,112 B1 | 10/2006 | Guyan et al. | 705/44 |
| 7,133,882 B1 | 11/2006 | Pringle et al. | 1/1 |
| 7,139,766 B2 | 11/2006 | Thomson et al. | 707/101 |
| 7,143,100 B2 | 11/2006 | Carlson et al. | 707/101 |
| 7,162,540 B2 | 1/2007 | Jasen et al. | 709/242 |
| 7,257,594 B2 | 8/2007 | Tamboli et al. | 701/101 |
| 7,257,820 B2 | 8/2007 | Fischer et al. | 719/316 |
| 7,287,041 B2 | 10/2007 | Barnes-Leon et al. | 707/104.1 |
| 7,337,192 B2 | 2/2008 | Stark et al. | 707/104.1 |
| 7,349,861 B1 | 3/2008 | Fischer et al. | 705/7 |
| 7,370,009 B1 | 5/2008 | Notani et al. | 705/28 |
| 7,412,404 B1 | 8/2008 | Tenorio | 715/236 |
| 7,680,818 B1 | 3/2010 | Fan et al. | 707/999.103 |
| 2001/0011245 A1 * | 8/2001 | Duhon | 705/38 |
| 2001/0051907 A1 * | 12/2001 | Kumar et al. | 705/36 |
| 2002/0007343 A1 * | 1/2002 | Oyama et al. | 705/39 |
| 2002/0019765 A1 | 2/2002 | Mann et al. | 705/11 |
| 2002/0023004 A1 | 2/2002 | Hollander et al. | 705/22 |
| 2002/0035431 A1 | 3/2002 | Ell | 702/5 |
| 2002/0035488 A1 | 3/2002 | Aquila et al. | 705/4 |
| 2002/0040313 A1 | 4/2002 | Hunter et al. | 705/9 |
| 2002/0040339 A1 * | 4/2002 | Dhar et al. | 705/38 |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0133510 A1 | 9/2002 | Lau | 707/203 |
| 2002/0138582 A1 | 9/2002 | Chandra et al. | 709/206 |
| 2002/0169863 A1 * | 11/2002 | Beckwith et al. | 709/223 |
| 2002/0169867 A1 | 11/2002 | Mann et al. | 709/224 |
| 2002/0174417 A1 | 11/2002 | Sijacic et al. | 717/147 |
| 2002/0178077 A1 | 11/2002 | Katz et al. | 705/26 |
| 2002/0184085 A1 | 12/2002 | Lindia et al. | 705/11 |
| 2002/0184148 A1 | 12/2002 | Kahn et al. | 705/40 |
| 2002/0188513 A1 | 12/2002 | Gil et al. | 705/22 |
| 2002/0188538 A1 | 12/2002 | Robertson et al. | 705/35 |
| 2003/0014440 A1 | 1/2003 | Bussert et al. | 715/239 |
| 2003/0018502 A1 | 1/2003 | Rodriguez | 705/7 |
| 2003/0023580 A1 | 1/2003 | Braud et al. | 703/3 |
| 2003/0033437 A1 | 2/2003 | Fischer et al. | 709/310 |
| 2003/0071852 A1 | 4/2003 | Stimac | 345/810 |
| 2003/0097642 A1 | 5/2003 | Arai et al. | 716/1 |
| 2003/0110104 A1 | 6/2003 | King et al. | 705/28 |
| 2003/0131018 A1 | 7/2003 | Godoy et al. | 707/104.1 |
| 2003/0163597 A1 | 8/2003 | Hellman et al. | 709/316 |
| 2003/0163603 A1 | 8/2003 | Fry et al. | 709/238 |
| 2003/0229529 A1 | 12/2003 | Mui et al. | 705/8 |
| 2004/0002982 A1 | 1/2004 | Ersek et al. | 1/1 |
| 2004/0015515 A1 | 1/2004 | Beisiegel et al. | 707/103 Y |
| 2004/0034661 A1 | 2/2004 | Barron et al. | 707/104.1 |
| 2004/0039576 A1 | 2/2004 | He et al. | 705/1 |
| 2004/0093351 A1 | 5/2004 | Lee et al. | 707/104.1 |
| 2004/0122826 A1 | 6/2004 | Mackie | 707/100 |
| 2004/0128188 A1 | 7/2004 | Leither et al. | 705/11 |
| 2004/0162773 A1 * | 8/2004 | Del Rey et al. | 705/36 |
| 2004/0199536 A1 | 10/2004 | Barnes-Leon et al. | 705/26 |
| 2004/0215503 A1 | 10/2004 | Allpress et al. | 705/11 |
| 2004/0249854 A1 | 12/2004 | Barnes-Leon et al. | 703/103 Y |
| 2005/0021383 A1 | 1/2005 | Fliess et al. | 705/8 |
| 2005/0021391 A1 | 1/2005 | Lu et al. | 705/11 |
| 2005/0091249 A1 | 4/2005 | Hanson et al. | 707/101 |
| 2005/0160361 A1 | 7/2005 | Young | 715/513 |
| 2005/0197880 A1 | 9/2005 | Walsh et al. | 705/8 |
| 2006/0271446 A1 | 11/2006 | Leon et al. | 705/26 |
| 2007/0033531 A1 | 2/2007 | Marsh | 715/738 |
| 2007/0203710 A1 | 8/2007 | Habichler et al. | 705/1 |
| 2007/0208577 A1 | 9/2007 | Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0225949 A1 | 9/2007 | Sundararajan et al. | 703/2 |
| 2007/0226037 A1 | 9/2007 | Garg et al. | 705/1 |
| 2007/0226049 A1 | 9/2007 | Muralitharan et al. | 705/11 |
| 2007/0250408 A1 | 10/2007 | Leon et al. | 707/100 |
| 2007/0250419 A1 | 10/2007 | Kumar et al. | 705/34 |
| 2007/0265944 A1 | 11/2007 | Catahan, Jr. et al. | 705/30 |

OTHER PUBLICATIONS

Lowe, D Jordan; Geiger, Marshall A; Pany, Kurt; "The effects of internal audit outsourcing on perceived external auditor independence"; Auditing; 1999; ISSN: 0278-0380.*

Davidson, Ronald A; Wright, Michael E. "The effect of auditor attestation and tolerance for ambiguity on commercial lending decisions"; Journal of Accountancy; Jan. 2001, ISSN: 0021-8448.*

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage enriched information across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com)

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group; "Guidelines for using XML for Electronic Data Interchange." Presented at XML One—San Jose, Sep./Oct. 2001. 'the eBusiness framework'; Downloaded from http://web.archive.org/web/20040413182700/http://www.xmledi-group.org; 3 pages.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3.schools.com/Schema/schema_complex_empty.asp?;7 pages.

Routledge et al., UML and XML Schema, 2002, pp. 1-10.

Walter J. Savitch, "Java an Introduction to Computer Science & Programming," 2000, p. 478.

Walter J. Savitch, "Java an Introduction to Computer Science & Programming," 2000, pp. 458-467.

Walter J. Savitch, "Java an Introduction to Computer Science & Programming", 2000, p. 1.

"Fortis Investments Implements Unified Employee Management System Across 12 Countries" (Business Wire, Jul. 2004).

"Extract simplifies file conversion" Software Markets, Dec. 2, 1991. Retrieved via Dialog on Aug. 16, 2010.

Cover Pages "Siebel's Universal Application Network" Apr. 8, 2002 downloaded from xml.coverpages.org May 6, 2010.

Cover Pages "Siebel Announces Success with Universal Application Network (UAN)" Apr. 21, 2004 downloaded from xml.coverpages.org May 6, 2010.

Michael Kay, Editor "XSL Transformations (XSLT) Version 2.0 W3C Working Draft May 2, 2003" downloaded from http://www.w3.org/TR/2003/WD-xslt20-20030502/ May 6, 2010.

Eric Gropp "Transforming XML Schemas" Jan. 15, 2003, downloaded from xml.com May 6, 2010.

Sonic Software Corporation, Power Schemas With Stylus Studio™ Jan. 2004.

Anonymous; CambridgeDocs Releases xDoc SML Converter; Information Today; Mar. 1, 2001; vol. 20, Issue 3; p. 49.

Anonymous; "HR-XML Consortium Sponsors Panel Discussion/Demonstrates Draft Protocol at IHRIM Conference and Expo;" Business Wire; Jun. 28, 2000; 4 pages.

Ohlhorst, Frank J., "ScanSoft's OmniForm Fills Bill for Forms-Driven Customers," CRN; Jericho: Feb. 17, 2003, Issue 1033; p. 51 (1 page).

Seminerio, Maria, "Job Agencies Will Hire HR-XML—Protocol Promises a Lingua Franca for Resumes;" eWeek; Jan. 1, 2001; vol. 18, Issue 1; p. 45.

* cited by examiner

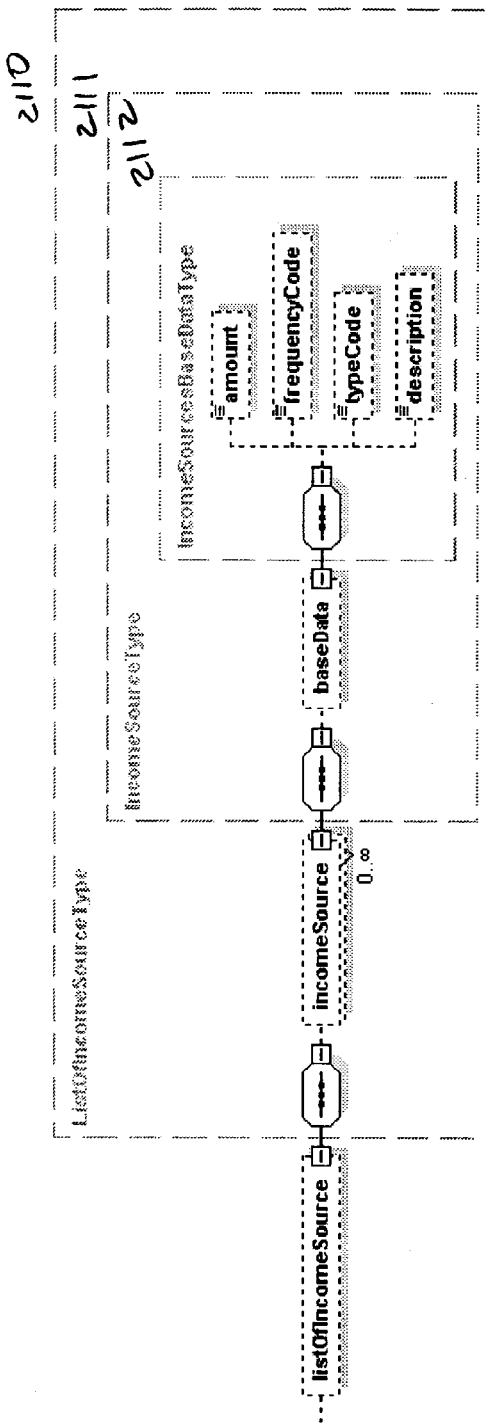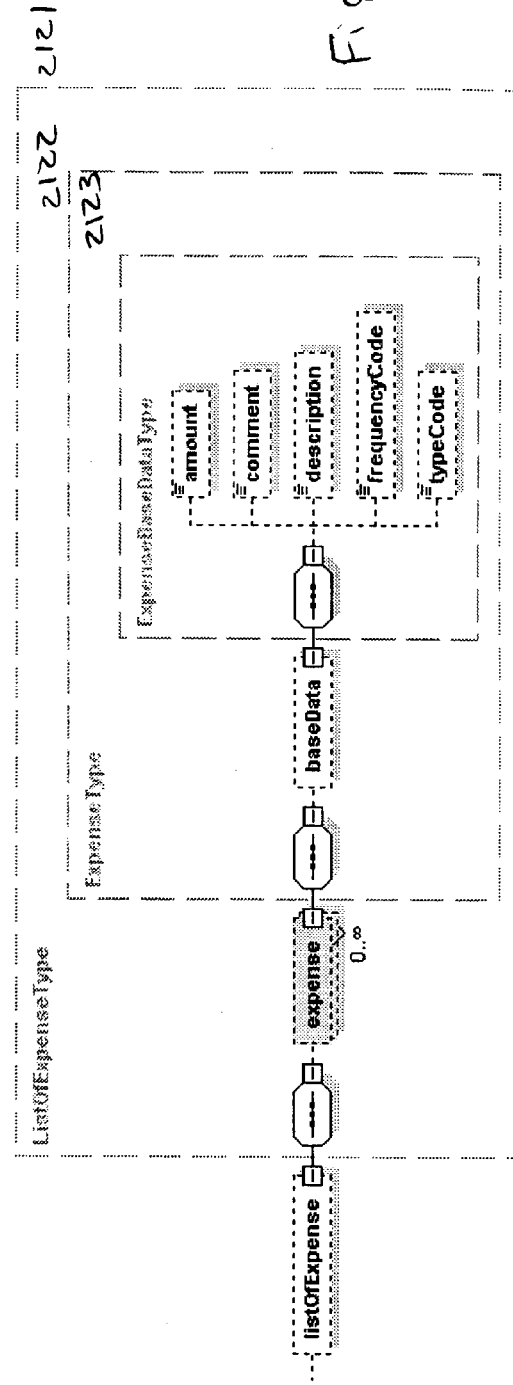
Fig 21A
Fig 21B

FINANCIAL SERVICES DATA MODEL

CROSS-REFERENCE TO RELATED APPLICATION

The present application claims the benefit of U.S. Provisional Patent Application No. 60/435,461, filed Dec. 20, 2002, which is herein incorporated in it's entirety by reference.

TECHNICAL FIELD

The described technology relates generally to data modeling and particularly to modeling of business information.

BACKGROUND

Various business entities, such as companies, store information electronically in furtherance of their business needs. These companies may have extensive databases of information that include customer tables, supplier tables, employee tables, and so on. The schemas and data models associated with these databases may be customized to help meet the business needs of the company. For example, an automotive manufacturer may organize information about its customers in a way that is very different from the way that an online bookstore may organize information about its customers. Even within a single company, that company may use many different application programs that employ very different schemas and data models. For example, a customer relationship management application program may use a data model that is very different from the data model used by an accounting program. The use of customized data models by a company and by applications within the company has the advantage of allowing information to be modeled in a way that is appropriate for the business needs of the company. Unfortunately, because of this diversity in the data models, it is not easy for the company to share its information with other companies or for applications to share their information.

The financial industry has been plagued by data models for financial information that are customized to individual financial institutions and thus make it difficult for financial institutions to share information. For example, major credit reporting services provide their credit reports in very different formats and with very different types of information. As a result, credit reports from different reporting services are typically stored in a raw format without any schema or data structure associated with the reports. Thus, the financial institutions that receive these credit reports cannot effectively automate the processing of the information on the credit reports. As another example, financial institutions may use very different models to store data relating to applications for different types of financial products (e.g., loan applications, brokerage account applications, and checking account applications). The data models for these applications are typically customized to support the "standard" applications electronically, but they cannot accommodate "non-standard" applications electronically. In addition the application models for different types of applications may be customized to each type of application. As an example, a financial institution may have a loan application data model and a separate checking account application data model. As described above, such diversity in application data models makes it difficult for financial institutions and financial application programs to share financial information.

Various attempts have been made to define standard data models so that information can be more easily shared between companies and applications. For example, the Open Applications Group has defined a standard data model that can be used by companies and applications when sharing information. A problem with these data models is that they do not provide effective ways to model relationships between various parties, such as a person or a company. In addition, if a company or an application developer wants to customize the standard data model, the customized data model may not be compatible with future upgrades of the standard data model. It would be desirable to have a data model that would more effectively model relationships and facilitate the upgrading of customizations of the data model.

BRIEF DESCRIPTION OF THE DRAWINGS

FIG. 21A is a diagram illustrating data elements of the listOfIncomeSource class in one embodiment.

FIG. 21B is a diagram illustrating data elements of the listOfExpense class in one embodiment.

DETAILED DESCRIPTION

Figure 1:
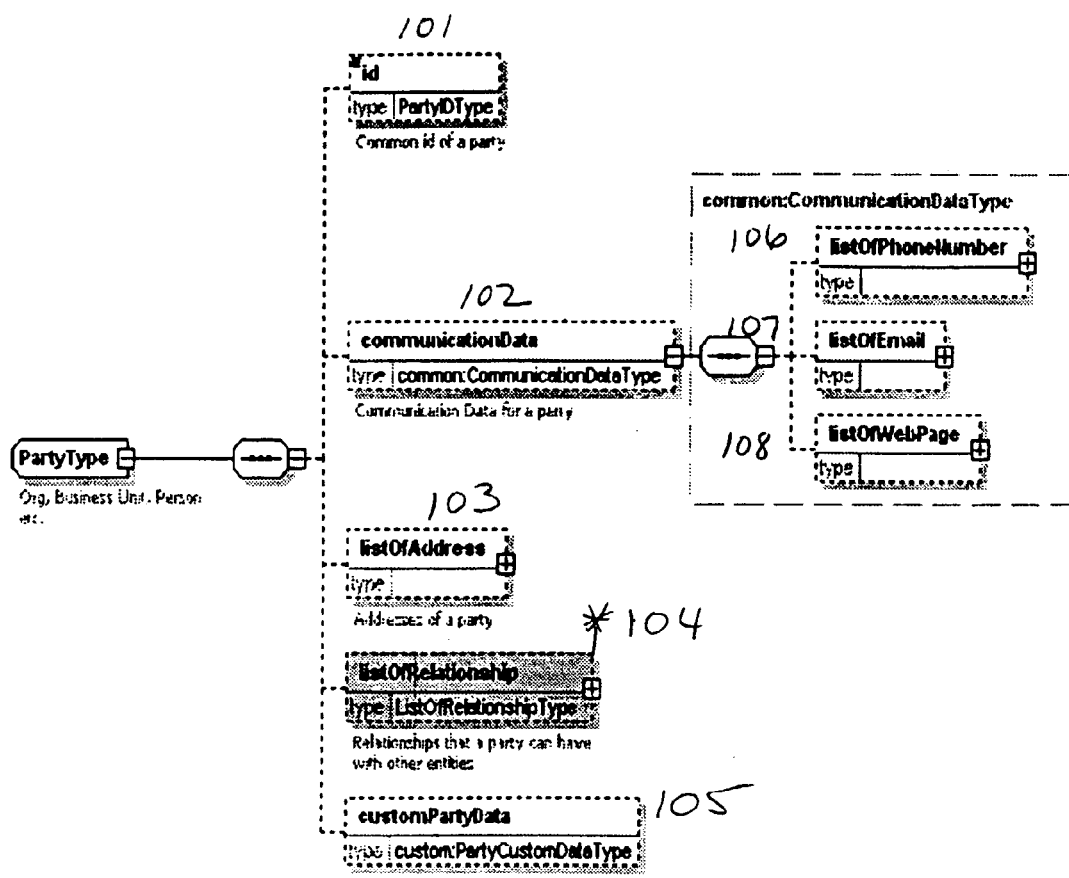
FIG. 1 illustrates the highest level data elements of the party class.

A data model that allows for relationships between entities, also referred to as parties, to be modeled as attributes of an entity and for the data model to be customized in a manner that facilitates upgrading of the data model is provided. In one embodiment, the data model defines a party class that includes a party identifier and a list of relationships of that party with other parties. The relationships may include represented-by relationships, customer-of relationships, contact-of relationships, or employee-of relationships. The party class can be sub-classed (i.e., be a base class for a derived class) depending on the type of party that is being modeled. The types of parties may include a business unit, household, organization, person, and so on. A business unit is generally a corporation, division, or group of individuals that provides services or products for the organization (e.g., company) that is using the data model. A household is a group of individuals who commonly share the same dwelling and compose a family or social unit. An organization is an institution, a corporation, an administrative and functional structure with a common purpose, or other grouping of people. A person is an individual. A customer is a person, organization, or household who uses products or services provided by a business unit. An employee is a person employed by an organization. A contact is a person serving as a representative, messenger, or liaison for an organization or another person. A representative is a person who represents an organization or another person. The data model models the relationships as attributes associated with a party. For example, a person may have a customer relationship with several different business units. In such a case, the data model specifies that information relating to each business unit would be associated with that person. In one embodiment, the data model is specified using a schema language such as XML Schema.

In one embodiment, the data model defines a hierarchy of the data elements for describing a party. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements for the custom data element type. For example, the data elements relating to the relationship of an employee of an organization may have a custom data element through which data elements relating to the salary history of the employee can be defined. Because the custom data elements are defined at various places within the hierarchy, the customizations of the data model can be associated with related data elements within the hierarchy.

Table 1 lists the data elements of a party class in one embodiment. The indentation of the data element names indicates data sub-elements of complex data elements. For example, the addressRelationshipData data element of line 10 includes the data sub-elements of endDate, occupancyTypeCode, startDate, and typeCode. These data sub-elements may themselves be complex data elements with data sub-elements (not shown in the table). For example, the startDate data element of line 13 could have data sub-elements of year, month, and day. Lines 28-85 list the data elements that define the various relationships of the party. Lines 15, 35, 57, 63, 70, 84, 85, and 86 list customData elements of a type appropriate for the enclosing complex data element. For example, the customData element defined at line 35 allows for custom data to be defined that relates to the enclosing representedBy complex data element.

TABLE 1

| | |
|---|---|
| 1. | party |
| 2. | id |
| 3. | communicationData |
| 4. | ... |
| 5. | listOfAddress |
| 6. | address |
| 7. | id |
| 8. | baseData |
| 9. | ... |
| 10. | addressRelationshipData |
| 11. | endDate |
| 12. | occupancyTypeCode |
| 13. | startDate |

TABLE 1-continued

| | |
|---|---|
| 14. | typeCode |
| 15. | customData |
| 16. | listOfAlternateId |
| 17. | alternateId |
| 18. | listOfLicenseData |
| 19. | classCode |
| 20. | countryCode |
| 21. | expiryDate |
| 22. | issueDate |
| 23. | number |
| 24. | province |
| 25. | stateCode |
| 26. | suspensionEndDate |
| 27. | typeCode |
| 28. | listOfRelationship |
| 29. | listOfRepresentedBy |
| 30. | representedBy |
| 31. | person |
| 32. | relationshipData |
| 33. | jobTitle |
| 34. | statusCode |
| 35. | customData |
| 36. | listOfCustomerOf |
| 37. | customerOf |
| 38. | busUnit |
| 39. | relationshipData |
| 40. | historyCode |
| 41. | satisfactionRatingCode |
| 42. | statusCode |
| 43. | typeCode |
| 44. | listOfBillingProfile |
| 45. | id |
| 46. | baseData |
| 47. | billTypeCode |
| 48. | billFrequencyCode |
| 49. | billDay |
| 50. | budgetBillFlag |
| 51. | mediaTypeCode |
| 52. | manualBillCount |
| 53. | manualBillVerificationReason |
| 54. | ... |
| 55. | paymentMethodData |
| 56. | relatedParty |
| 57. | customData |
| 58. | householdCustomerData |
| 59. | demographicSegmentCode |
| 60. | lifecycleStatusCode |
| 61. | marketSegmentCode |
| 62. | annualRevenue |
| 63. | customData |
| 64. | listOfContactOf |
| 65. | contactOf |
| 66. | org |
| 67. | relationshipData |
| 68. | jobTitle |
| 69. | statusCode |
| 70. | customData |
| 71. | listOfEmployeeOf |
| 72. | employeeOf |
| 73. | org |
| 74. | relationshipData |
| 75. | currentEmployerFlag |
| 76. | endDate |
| 77. | jobTitle |
| 78. | number |
| 79. | occupationCode |
| 80. | startDate |
| 81. | typeCode |
| 82. | userName |
| 83. | yearsEmployed |
| 84. | customData |
| 85. | customData |
| 86. | customData |

Table 2 lists the data elements of the business unit class in one embodiment. The business unit class inherits the party class as indicated by line 1.

TABLE 2

| | |
|---|---|
| 1. | busUnit:party |
| 2. | baseData |
| 3. | name |
| 4. | customData |

Table 3 lists the data elements of the household class in one embodiment. The household class inherits the party class as indicated by line 1.

TABLE 3

| | |
|---|---|
| 1. | household:party |
| 2. | baseData |
| 3. | name |
| 4. | familyTypeCode |
| 5. | numberOfPeople |
| 6. | annualIncome |
| 7. | netWorth |
| 8. | uniqueName |
| 9. | customData |

Table 4 lists the data elements of the organization class in one embodiment. The organization class inherits the party class as indicated by line 1.

TABLE 4

| | |
|---|---|
| 1. | org:party |
| 2. | baseData |
| 3. | name |
| 4. | dunsNumber |
| 5. | customData |

Table 5 lists the data elements of the person class in one embodiment. The person class inherits the party class as indicated by line 1.

TABLE 5

| | |
|---|---|
| 1. | person:party |
| 2. | baseData |
| 3. | firstName |
| 4. | lastName |
| 5. | fullName |
| 6. | middleName |
| 7. | shortName |
| 8. | nameSuffix |
| 9. | titleCode |
| 10. | genderCode |
| 11. | maritalStatusCode |
| 12. | birthDate |
| 13. | annualIncomeAmount |
| 14. | dependents |
| 15. | ethnicityCode |
| 16. | homeOwnerFlag |
| 17. | customData |

Each of the types of a party specify a custom data element for that type. For example, the customData data element of the person class in Table 5 may be defined as being a PersonCustomDataType. If so, the person class can be customized by adding data elements to the definition of the PersonCustomDataType. The definition may be stored in a file that is separate from the file in which the person class is defined. A portion of an XML schema that defines the custom data for a personClass is <xs:element name="customData" type=
 "custom:PersonCustomDataType" minOccurs="0"/>
where "custom:" specifies a file that contains the definition of PersonCustomDataType, which may be
 <xs: complexType name="PersonCustomDataType">
  <xs:annotation
   <xs:documentation>

Define the custom data element for this type following this annotation
<xs:documentation>
</xs annotation>
</xs:complexType>

FIGS. 1-12 are block diagrams illustrating the data model in one embodiment. One skilled in the art will appreciate that the name of each data element is descriptive of the information stored in the data element. FIG. 1 illustrates the highest level data elements of the party class in one embodiment. The highest level data elements include id 101, communicationData 102, listOfAddress 103, listOfRelationship 104, and customPartyData 105 data elements. The id data element may be a unique identifier of a party. The communicationData data element includes listOfPhoneNumber 106, listOfEmail 107, and listOfWebPage 108 data elements that provide communication information relating to the party. The listOfAddress data element contains a list of addresses for the party (e.g., a P.O. box and residence address for a household). The listOfRelationship data element defines data elements for describing various types of relationships. The customPartyData data element initially contains no data elements, but custom data elements can be added by defining data elements in the PartyCustomDataType.

Figure 2:
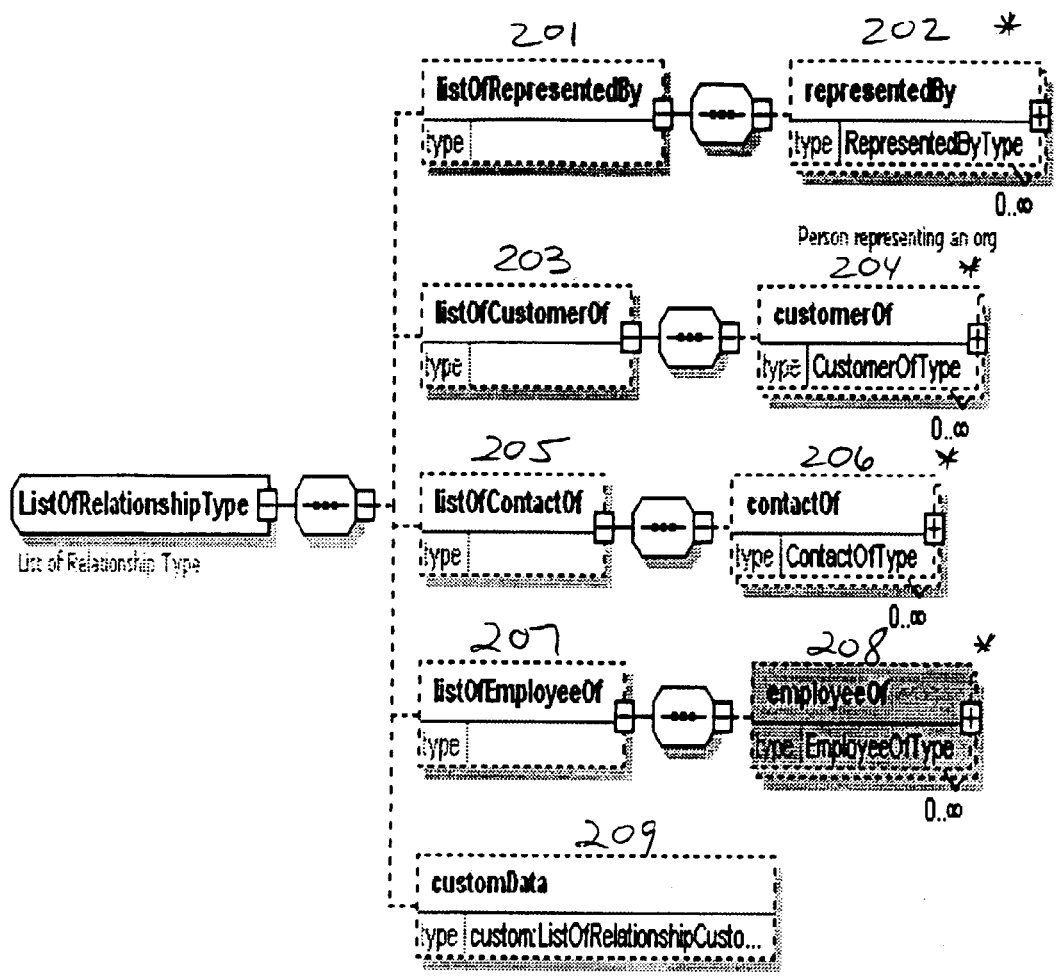
FIG. 2 illustrates the data elements of the listOfRelationship class in one embodiment.

FIG. 2 illustrates the data elements of the listOfRelationship class in one embodiment. The listOfRelationship class includes listOfRepresentedBy 201, listOfCustomerOf 203, listOfContactOf 205, and listOfEmployeeOf 207 data elements that contain zero or more instances of the corresponding data sub-elements 202, 204, 206, and 208. The listOfRelationship class also includes a customData 209 data element with a type of listOfRelationshipCustomDataType that initially is defined to have no data elements.

Figure 3:
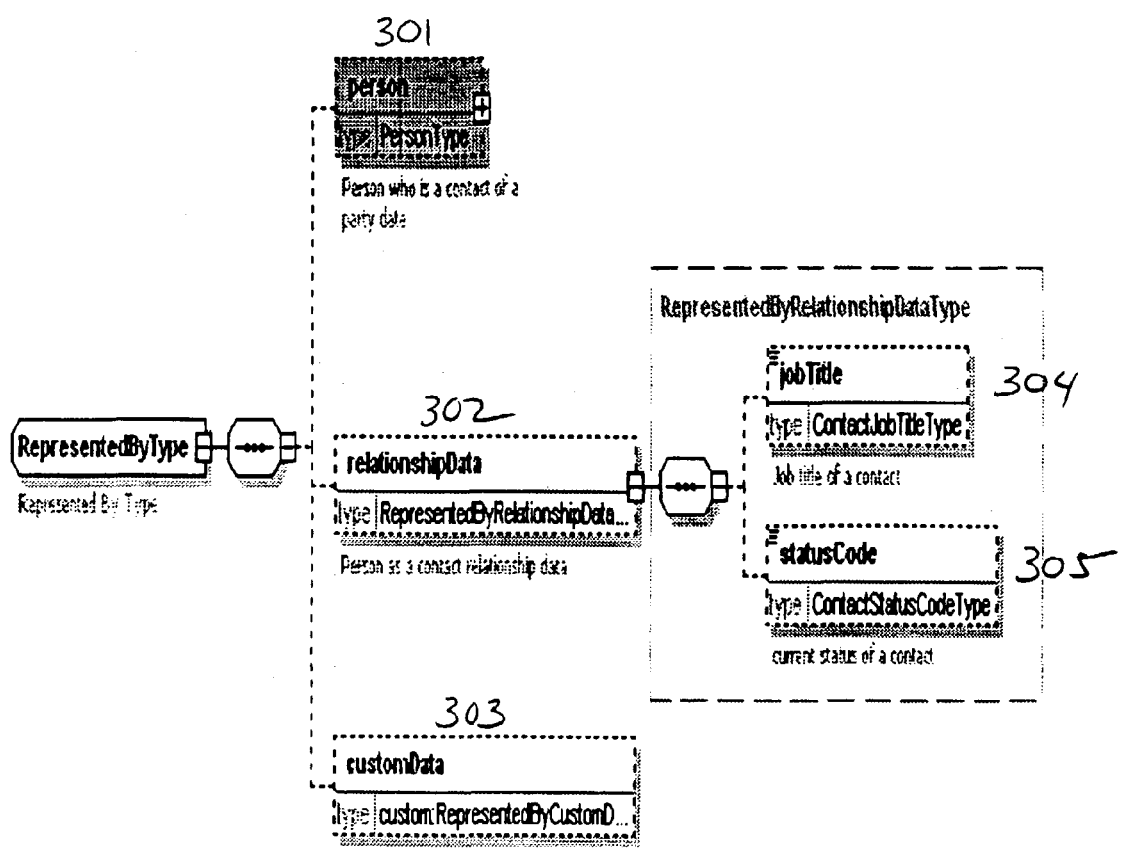
FIG. 3 illustrates the data elements of the representedBy class in one embodiment.

FIG. 3 illustrates the data elements of the representedBy class in one embodiment. The representedBy class includes person 301, relationshipData 302, and customData 303 data elements. The relationshipData data element includes the jobTitle 304 and statusCode 305 data elements. Each of the customData data elements described in FIGS. 1-12 has a unique type that initially has no data elements defined.

Figure 4:
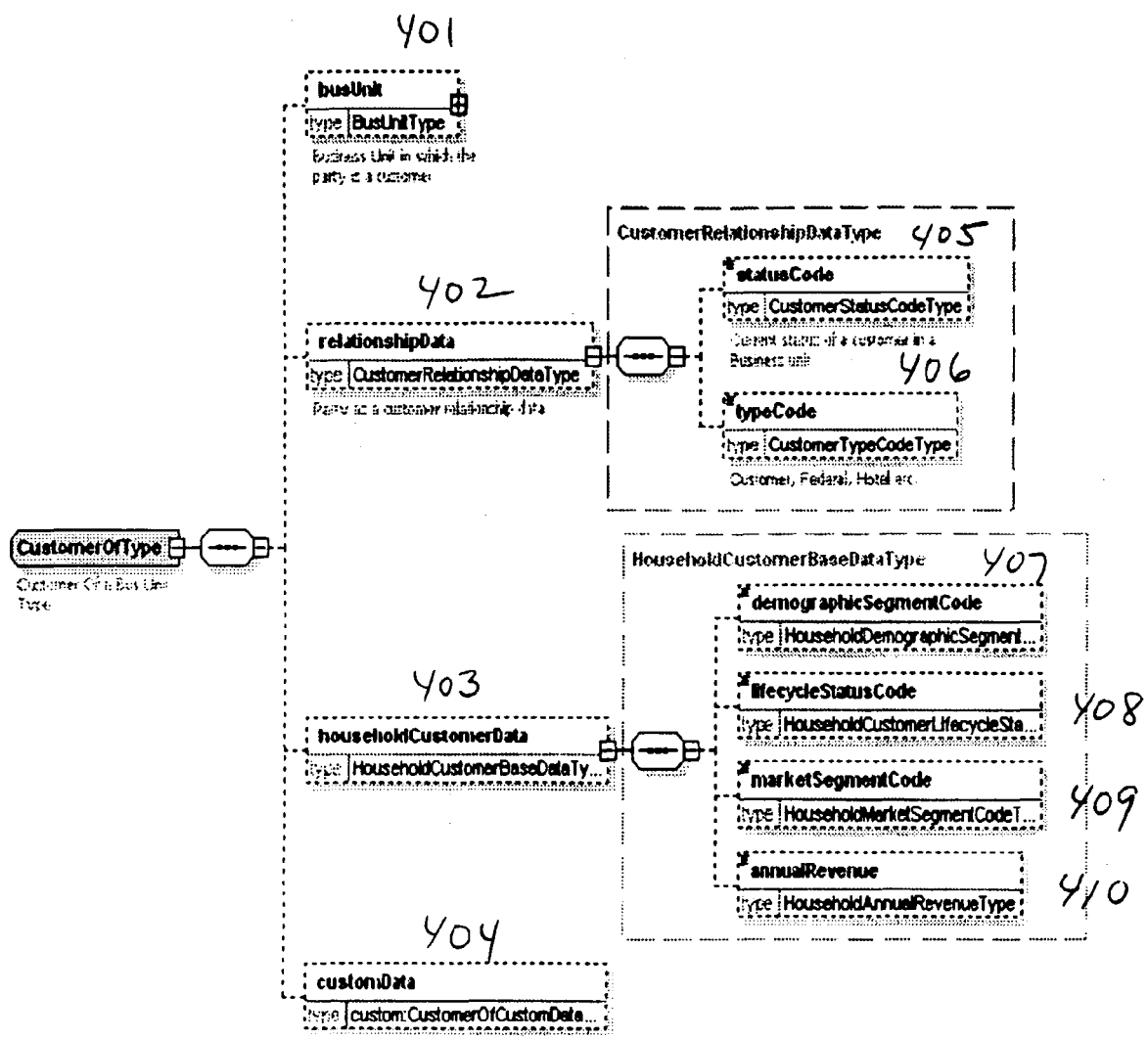
FIG. 4 illustrates the data elements of the customerOf class in one embodiment.

FIG. 4 illustrates the data elements of the customerOf class in one embodiment. The customerOf class includes busUnit 401, relationshipData 402, householdCustomerData 403, and customData 404 data elements. The busUnit data element identifies the type of the business unit. The relationshipData data element includes statusCode 405 and typeCode 406 data elements. The householdCustomerData data element includes demographicSegmentCode 407, lifecycleStatusCode 408, marketSegmentCode 409, and annual Revenue 410 data elements.

Figure 5:
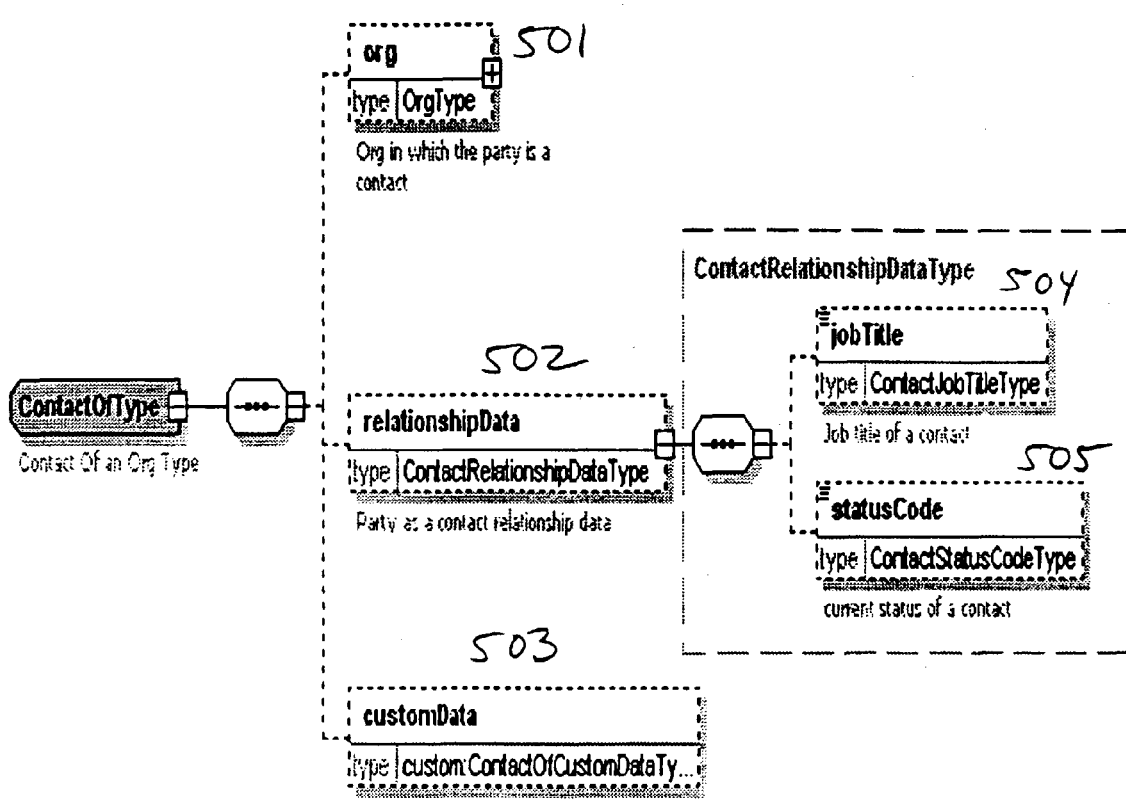
FIG. 5 illustrates the data elements of the contactOf class in one embodiment.

FIG. 5 illustrates the data elements of the contactOf class in one embodiment. The contactOf class includes org 501, relationshipData 502, and customData 503 data elements. The relationshipData data element includes jobTitle 504 and statusCode 505 data elements.

Figure 6:
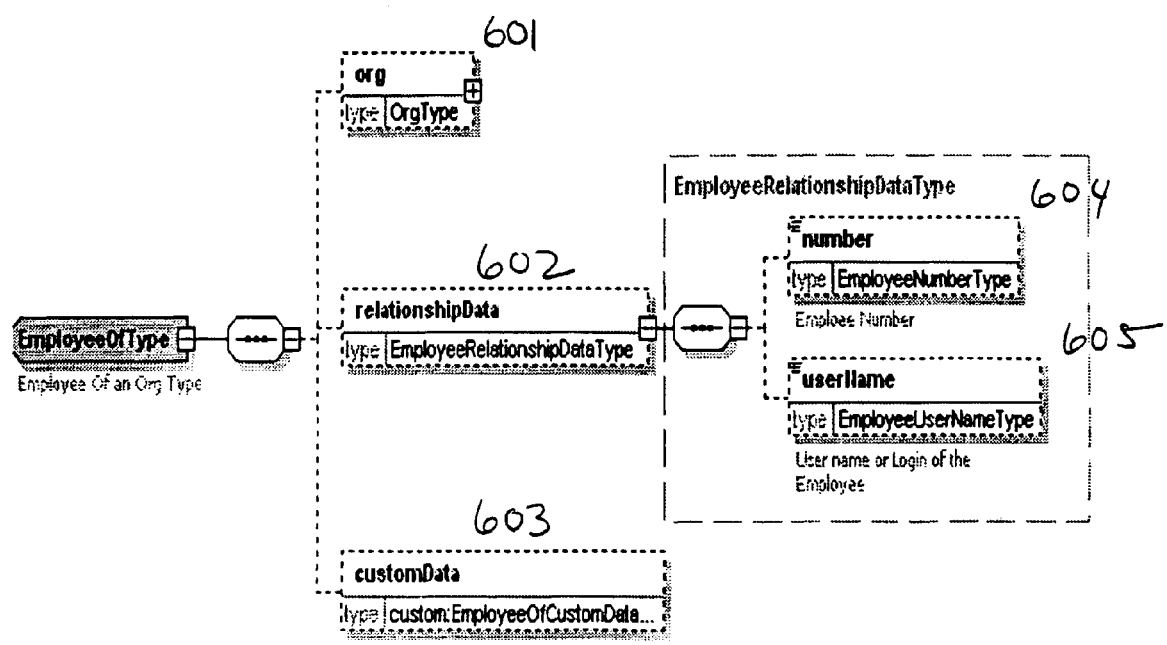
FIG. 6 illustrates the data elements of the employeeOf class in one embodiment.

FIG. 6 illustrates the data elements of the employeeOf class in one embodiment. The employeeOf class includes org 601, relationshipData 602, and customData 603 data elements. The relationshipData data element includes number 604 and userName 605 data elements.

Figure 7:
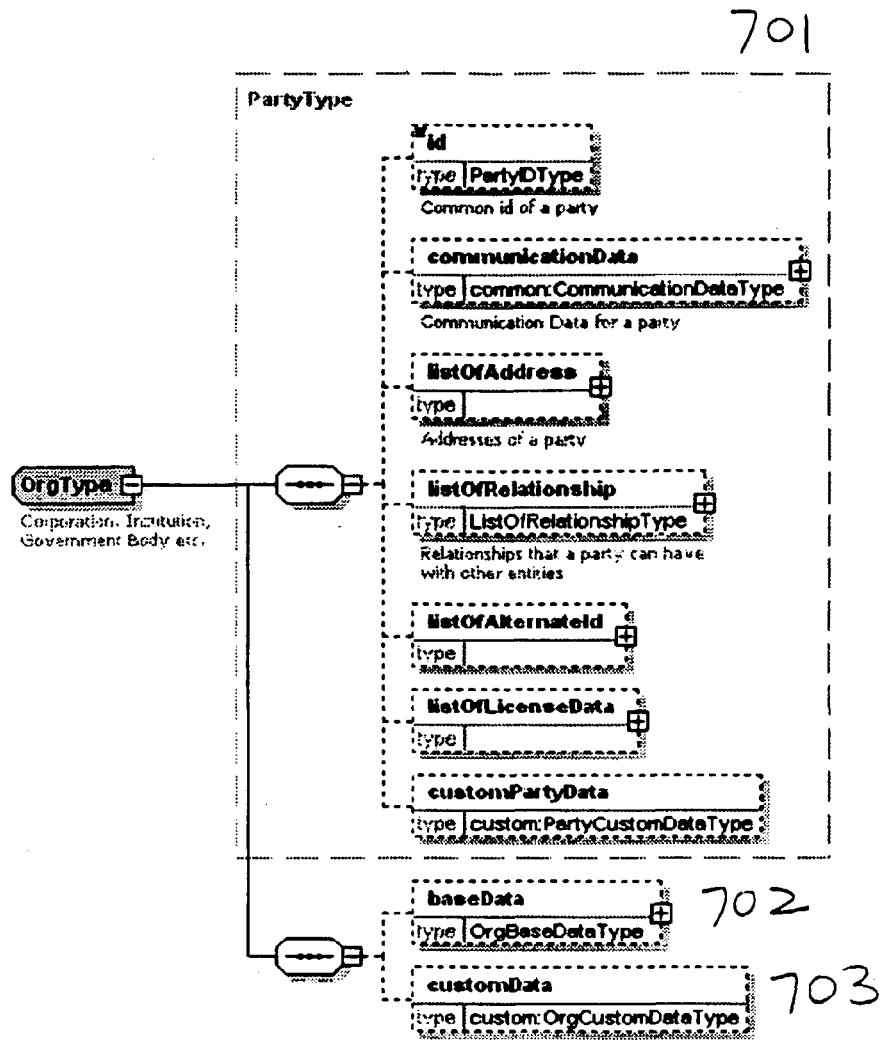
FIG. 7 illustrates the data elements of the org class.
Figure 8:
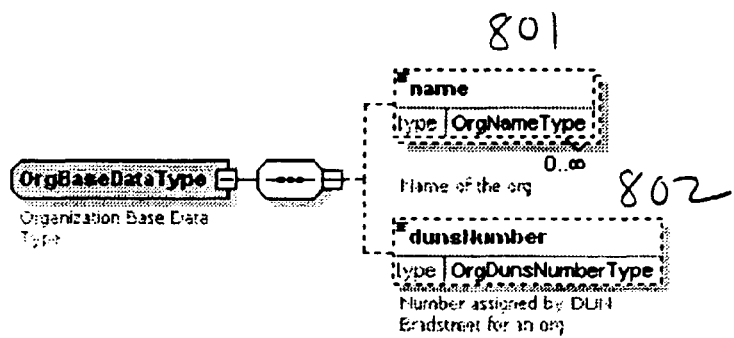
FIG. 8 illustrates the data elements of the baseData data element of the org class in one embodiment.

FIGS. 7-12 illustrate the inheritance of the party class by the classes of the entities. Each of these classes inherit the party class and define a baseData element that is specific to that class and a customData data element. FIG. 7 illustrates the data elements of the org class in one embodiment. The org class inherits the party class 701 and includes baseData 702 and customData 703 data elements. FIG. 8 illustrates the data elements of the baseData data element of the org class in one embodiment. The baseData data element includes name 801 and dunsNumber 802 data elements.

Figure 9:
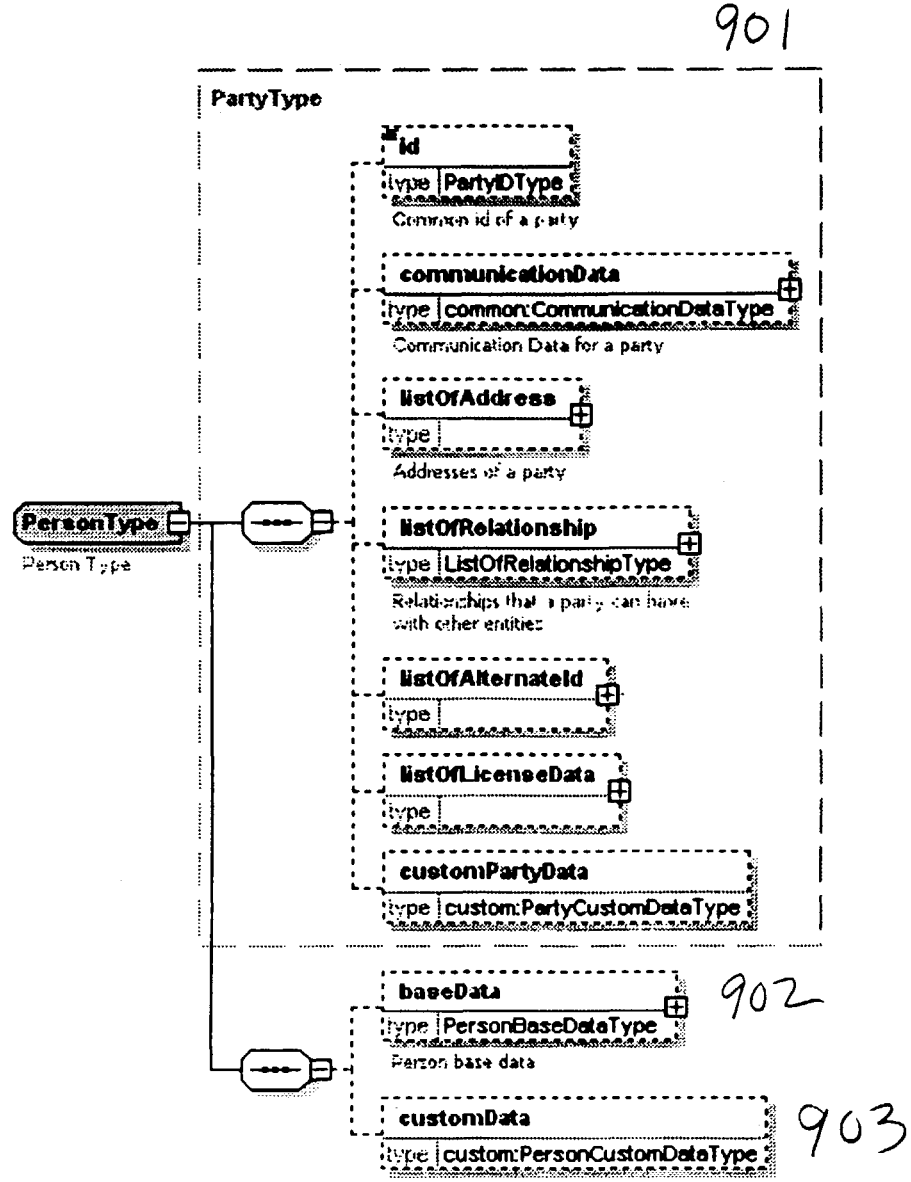
FIG. 9 illustrates the data elements of the person class.
Figure 10:
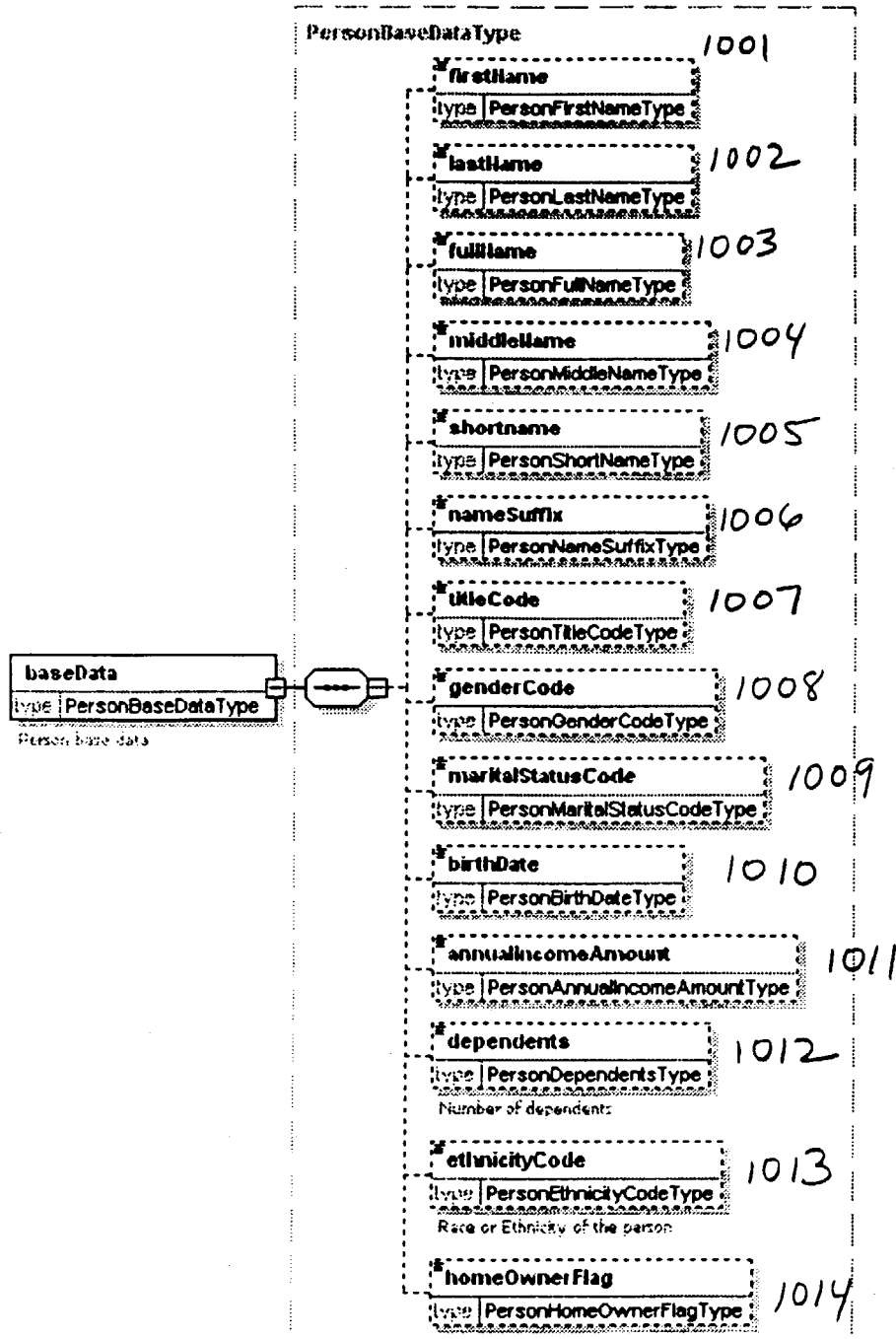
FIG. 10 illustrates a data elements of the baseData data element of the person class in one embodiment.

FIG. 9 illustrates the data elements of the person class. The person class inherits the party class 901 and includes baseData 902 and customData 903 data elements. FIG. 10 illustrates data elements of the baseData data element of the person class in one embodiment. The baseData element includes firstName 1001, lastName 1002, fullName 1003, middleName 1004, shortName 1005, nameSuffix 1006, titleCode 1007, genderCode 1008, maritalStatusCode 1009, birthDate 1010, annualIncomeAmount 1011, dependents 1012, ethnicityCode 1013, and homeOwnerFlag 1014 data elements.

Figure 11:
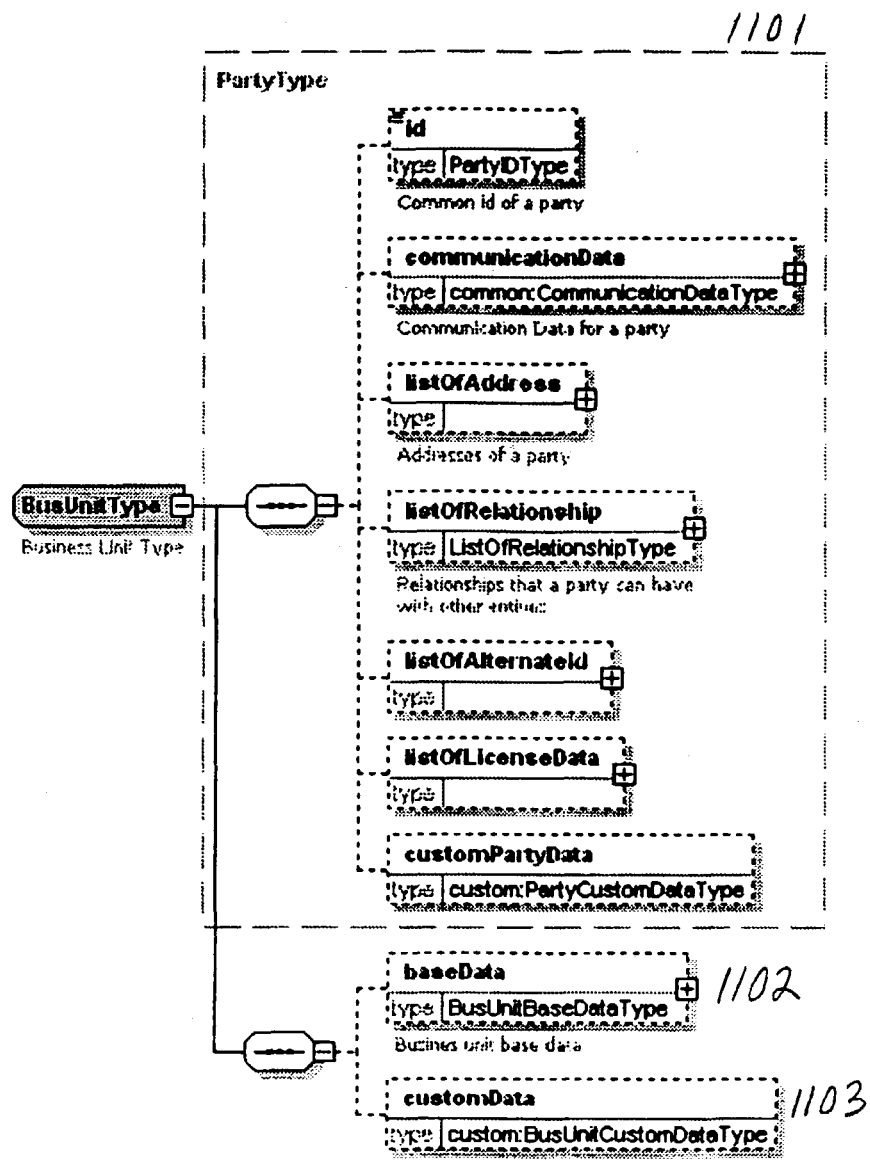
FIG. 11 illustrates the data elements of the busUnit class in one embodiment.
Figure 12:
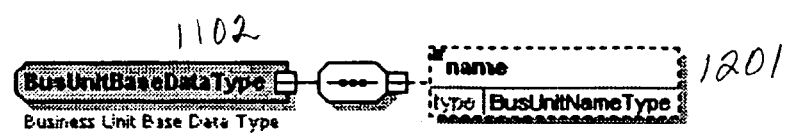
FIG. 12 illustrates the data elements of the baseData element of the busUnit class in one embodiment.

FIG. 11 illustrates the data elements of the busUnit class in one embodiment. The busUnit class inherits the party class 1101 and includes baseData 1102 and customData 1103 data elements. FIG. 12 illustrates the data elements of the baseData 1102 element of the busUnit class in one embodiment. The baseData data element includes the name 1201 data element.

Figure 13:
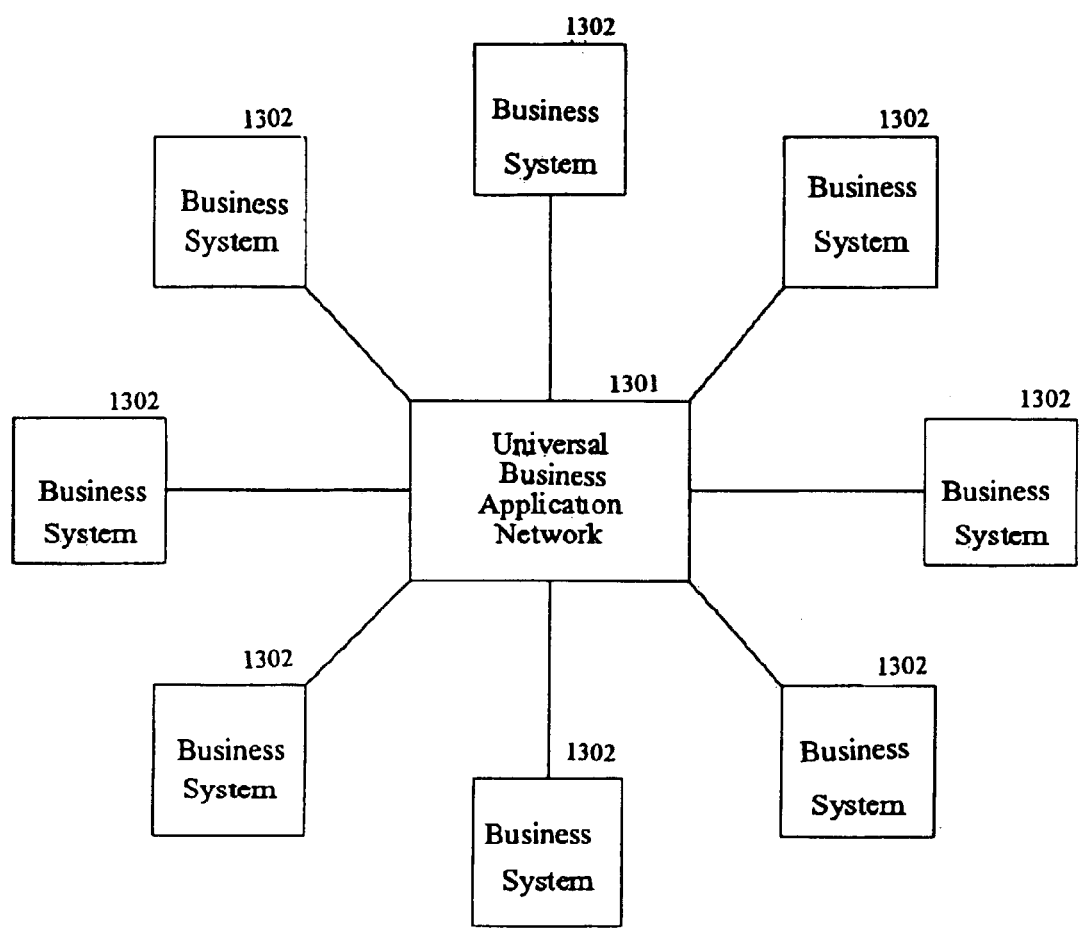
FIG. 13 is a block diagram illustrating the interconnection between business various systems and a universal business application network.

FIG. 13 is a block diagram illustrating the interconnection between various business systems 1302 and a universal business application network. The universal business application network 1301 serves as an integration hub for the business systems 1302. The architecture of the universal business application network 1301 allows new business applications that access legacy business systems to be developed with minimum customization. The legacy business systems can be provided by a single business organization or by different business organizations. The universal business application network 1301 also allows the business applications to exchange information using the party class. In one embodiment, the universal business application network uses the XML and Web services standards.

Figure 14:
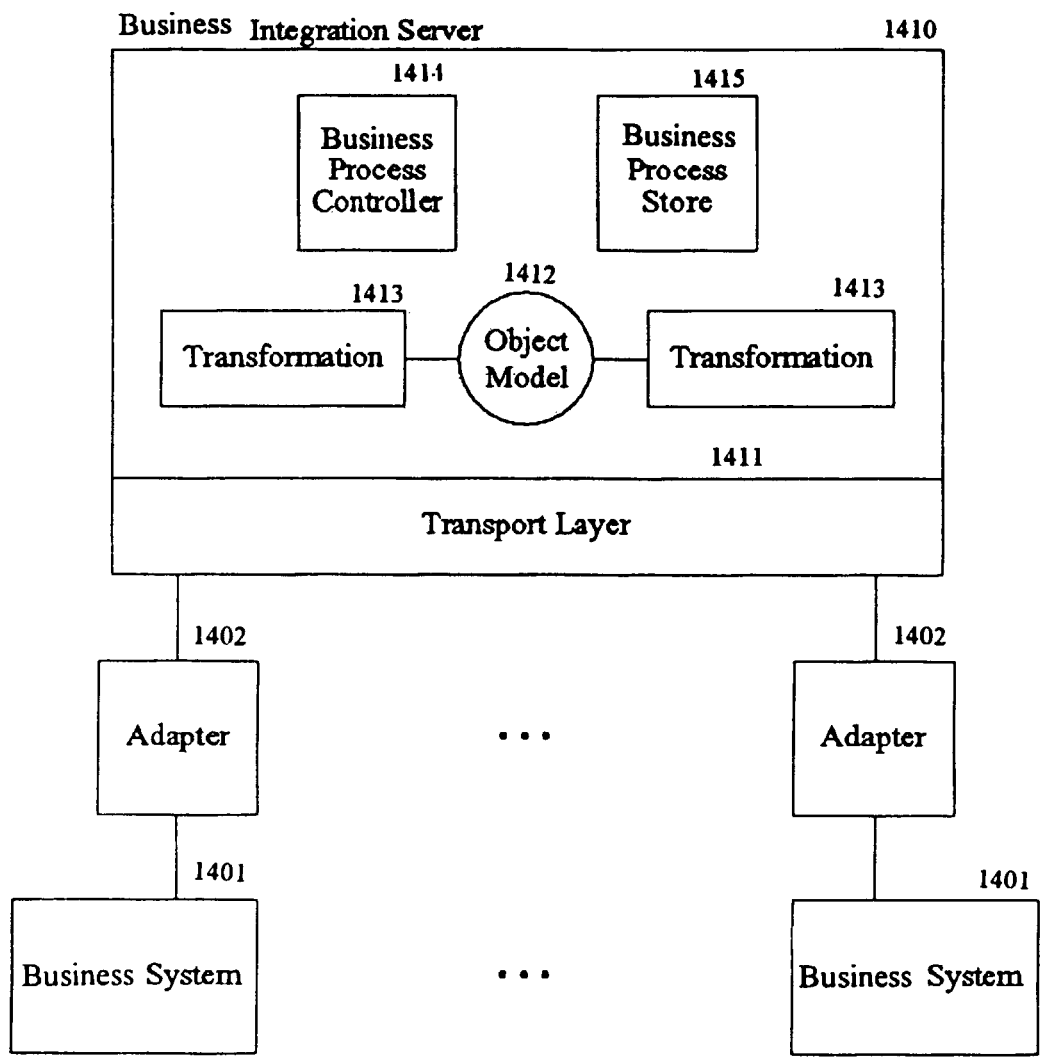
FIG. 14 is a block diagram illustrating the overall architecture of a universal business application network in one embodiment.

FIG. 14 is a block diagram illustrating the overall architecture of a universal business application network in one embodiment. The hub of the universal business application network is the business integration server 1410 that connects to the various business systems 1401 via adapters 1402. The business integration server includes a transport layer 1411, an object model 1412, transformation stores 1413, a business process controller 1414, and a business process store 1415. The transport layer is a mechanism through which business information is exchanged between the business systems and the business integration server. Each business system may have an adapter that is appropriate to the protocol of the transport layer. For example, the transport mechanism may use communications protocols such as TCP/IP. The transport layer may provide a messaging service for queuing, for guaranteeing delivery of messages, and for handling both synchronous and asynchronous messaging, such as that provided by IBM MQSeries and TIBCO Rendezvous. The adapters relay events from the business systems to the integration server and can import configurations of the business systems into the business integration server. In addition, the universal business application network may include encryption and authentication mechanisms to ensure the security and integrity of the information. For example, authentication will help ensure that a business process is accessing the intended business system, rather than an impostor business system. The object model or data model may contain the definition of various business-related objects such as a party, a business unit, a household, an organization, and a person. The objects may be defined using standard object definition tools such as an XML schema definition tool. The transformation store contains transformations for transforming information received from the business systems to the format used by the object model, and vice versa. For example, a person object may include a globally unique identifier for each person. A transformation for a business system that does not use globally unique identifiers may need to access an identification server to determine the globally unique identifier for each person. The transformations may be specified as a computer program, an XML Stylesheet Language Transform ("XSLT"), etc. The business process store contains the business processes that have been defined. A business process may be specified as a script, a process flow, an executable program, etc. In one embodiment, the business processes are defined using the Web Services Flow Language ("WSFL"). The business processes orchestrate a sequence of steps across multiple applications provided by the business systems to achieve a business objective. The business process controller coordinates the execution of the business processes. The business process controller may instantiate objects and invoke functions of the objects in accordance with the various business processes. The business process controller may also initiate the execution of business processes based on pre-defined conditions and events. For example, the business process controller may launch a certain business process each time an alert is received. The business integration network may provide a standard library of business routines (not shown) that may be invoked by the business processes. For example, a standard business routine might be to identify whether two person objects represent the same individual or to apply business rules to various objects and take the appropriate action as defined by those rules. The business integration server may also include various tools to facilitate the development of business processes. These tools may aid in developing transformations, defining common objects, and writing process flows.

The computers (e.g., a universal business application network computer and a business systems computer) may include a central processing unit, memory, input devices (e.g., keyboard and pointing devices), output devices (e.g., display devices), and storage devices (e.g., disk drives). The memory and storage devices are computer-readable media that may contain instructions that implement the business system. In addition, the data structures and message structures may be stored or transmitted via a data transmission medium, such as a signal on a communications link.

Figure 15:
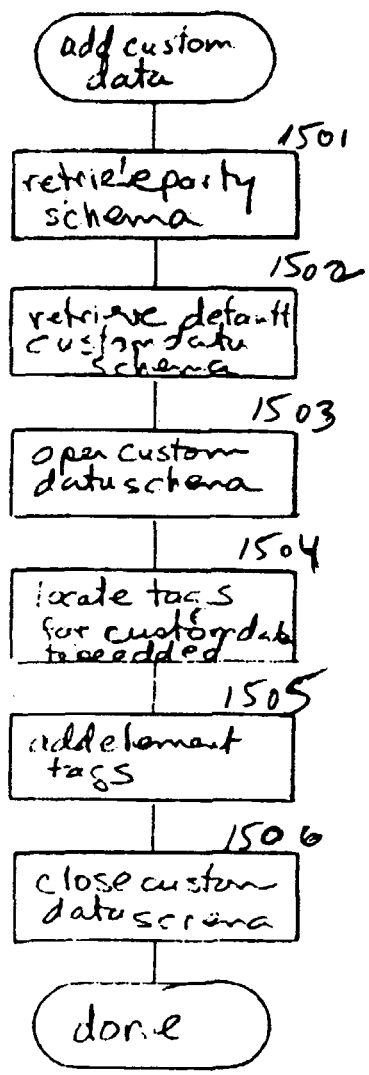
FIG. 15 is a flow diagram illustrating the process of adding custom data to a party class.

FIG. 15 is a flow diagram illustrating the process of adding custom data to a party class. In block 1501, the schema for the party class is retrieved. The schema may be an XML schema file that includes a customData data element of a type that is defined in another file. In block 1502, the schema for the types of custom data is retrieved. The schema may be stored in an XML schema file that contains the definition for each type of custom data. In block 1503, the custom data schema is opened. In block 1504, the tags relating to the custom data type of interest are located. In block 1505, the custom data elements are added to the located tags. In block 1506, the custom data schema with the newly defined data elements added to the custom data type is closed.

Figure 16:
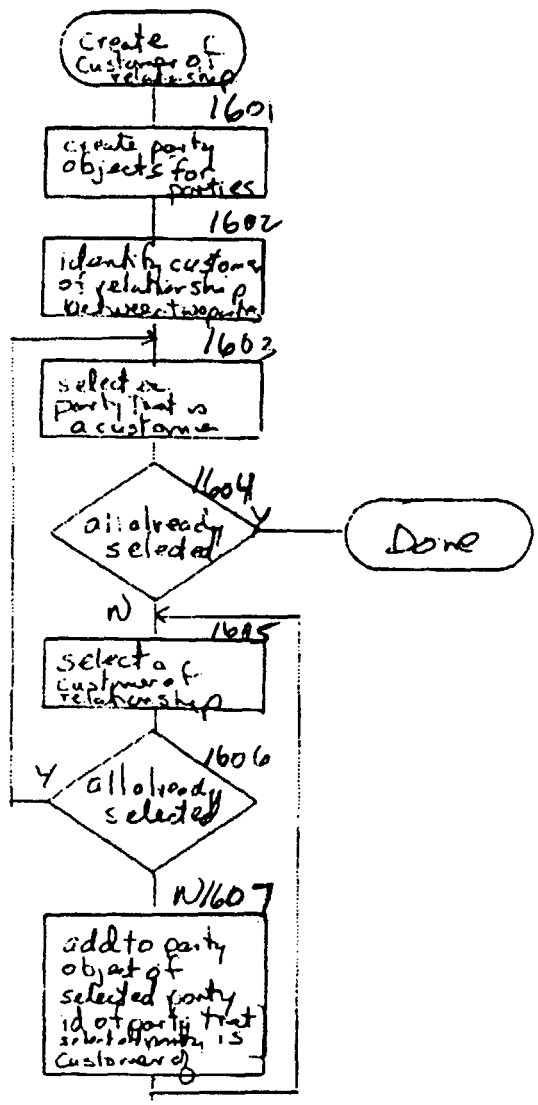
FIG. 16 is a flow diagram illustrating the process of creating a customer relationship for a party in one embodiment.

FIG. 16 is a flow diagram illustrating the process of creating a customer relationship for a party in one embodiment. In block 1601, the component creates party objects for various parties. In block 1602, the component identifies the customer relationships between parties. In block 1603, the component selects a party that is a customer in a customer relationship. In decision block 1604, if all such customers have already been selected, then the component completes, else the component continues at block 1605. In block 1605, the component selects the next customer relationship for that party. In decision block 1606, if all the customer relationships for the selected party have been selected, then the component loops to block 1603 to select the next party that has a customer relationship, else the component continues at block 1607. In block 1607, the component adds to the party object of the selected party the identifier of the party that the selected party is a customer of. The component than loops to block 1605 to select the next customer relationship for the selected party.

Financial Application

A financial application is a collection of data representing a request by a party to open an account with a financial institution. For example, a person who wants to purchase a home will provide application data so that a bank can lend money to purchase the home. The application data may include the name of the party purchasing the home, the loan amount, down payment amount, and so on. When a financial application is approved, a financial institution then opens the appropriate accounts for the party, such as a mortgage account, a checking account, etc.

In one embodiment, a financial application data model is provided that supports applications by multiple applicants for multiple types of accounts in a single application. For example, using a single application, a husband, wife and child may apply for a residential mortgage in the husband and wife's name, a savings account in the wife's name, and a credit card account in the child's name.

In such a case, the party associated with the application will have three applicants (the husband, the wife, and the child) and the application will be associated with three types of accounts (i.e., a mortgage account, a savings account, and a credit card account). Accordingly, in some embodiments, each financial application for a party may include a list of financial accounts applied for, and for each account applied for, a list of the applicants from the party that are to be identified with the account. In this way, a single application may be used to apply for multiple accounts for multiple applicants, even though not all applicants within a party will be associated with each account applied for.

The financial application data model supports storing all information necessary to represent this application in a single data structure. In addition, the financial application data model allows financial statement information to be defined in a separate financial statement data model that is referenced by the financial application data model. Like the financial application data model, the financial statement data model allows multiple applicants to be associated with (i.e., related to) the financial statement, along with their percentage of ownership of listed assets. The financial statement data model also stores an effective date ("as of date") of the financial statement. In addition, the financial statement data model can represent various liabilities of the applicant in a way that includes rating information derived from information provided by the organization (e.g., lender) associated with that liability.

Because financial statements are associated with financial application records, each financial statement record may be assigned a party identifier. When a financial application record is created, the appropriate financial statement records are identified using the party identifier and then associated with the financial application record. For example, if a party consists of a husband and wife, the identified financial statements may include a financial statement for the wife, a financial statement for the husband and a joint financial statement.

The financial application data model may include a primary flag for each account designated as a primary account. If, during the application process, the application is not approved with respect to the primary account, then the application will be completely rejected. In contrast, if an application for a non-primary account is rejected, then the application for the other accounts may still be accepted. The designation of the primary account is typically provided by a financial institution associated with the accounts being applied for.

The financial application data model may also allow for the collecting and storing of information relating to the financial account or accounts that will ultimately be created if the application is approved. Accordingly, once nascent accounts become actual accounts, information provided in the financial application can then be accessed via a financial account data model at some time during or after the application process.

Figure 17:
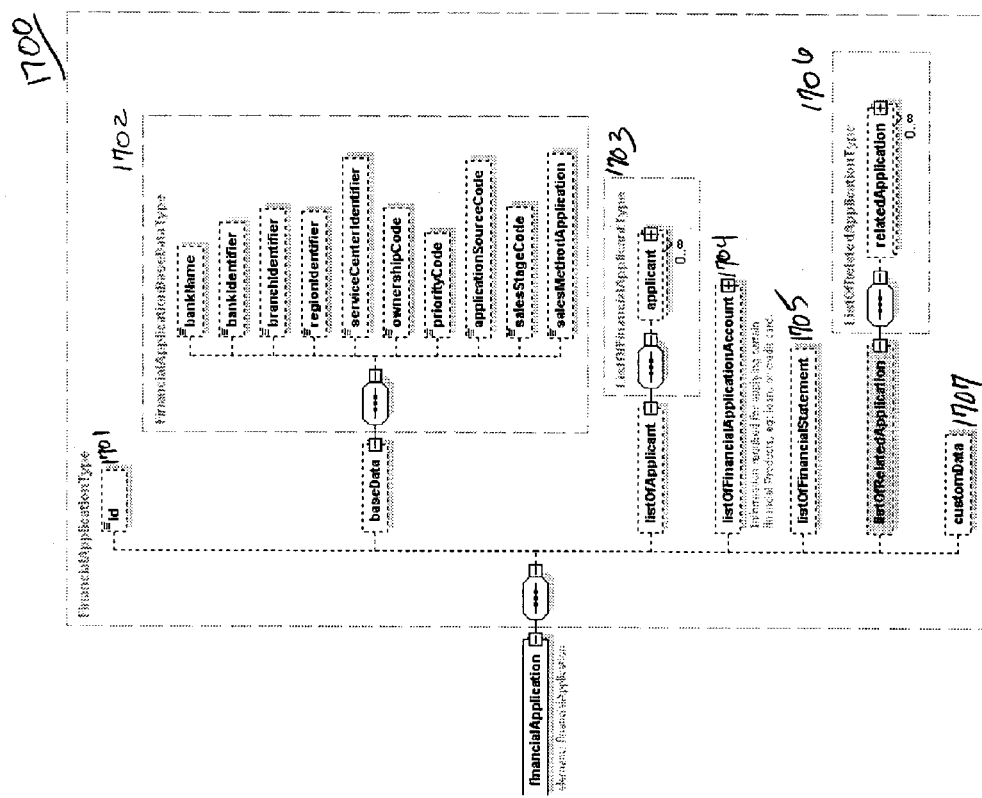
FIG. 17 is a diagram illustrating data elements of the financialApplication class in one embodiment.

FIG. 17 is a diagram illustrating data elements of the financialApplication class in one embodiment. The financialApplication class 1700 includes identifier 1701, baseData 1702, listOfApplicant 1703, listOfFinancialApplicationAccount 1704, listOfFinancialStatement 1705, listOfRelatedApplication 1706, and customData 1707 data elements. The baseData 1702 data element relates to the originating institution of the application and includes data elements representing bank name, bank identifier, branch identifier, region identifier, service center identifier, ownership code, priority code, application source code, sales stage code, and sales method application. The listOfApplicant 1703 data element allows multiple applicants (e.g., husband, wife, and child) to be associated with this application. Each applicant can have different roles (e.g., primary applicant, secondary applicant, and guarantor). The listOfFinancialApplicationAccount 1704 data element allows the applicants to apply for multiple accounts (e.g., line of credit account and checking account) in a single application. The listOfFinancialStatement 1705 data element allows multiple financial statements to be associated with this application (e.g., the husband and wife may have a combined financial statement that is separate from their child's financial statement). The listOfRelatedApplication 1706 data element allows multiple related applications (e.g., prior applications) to be associated with this application.

Figure 18:
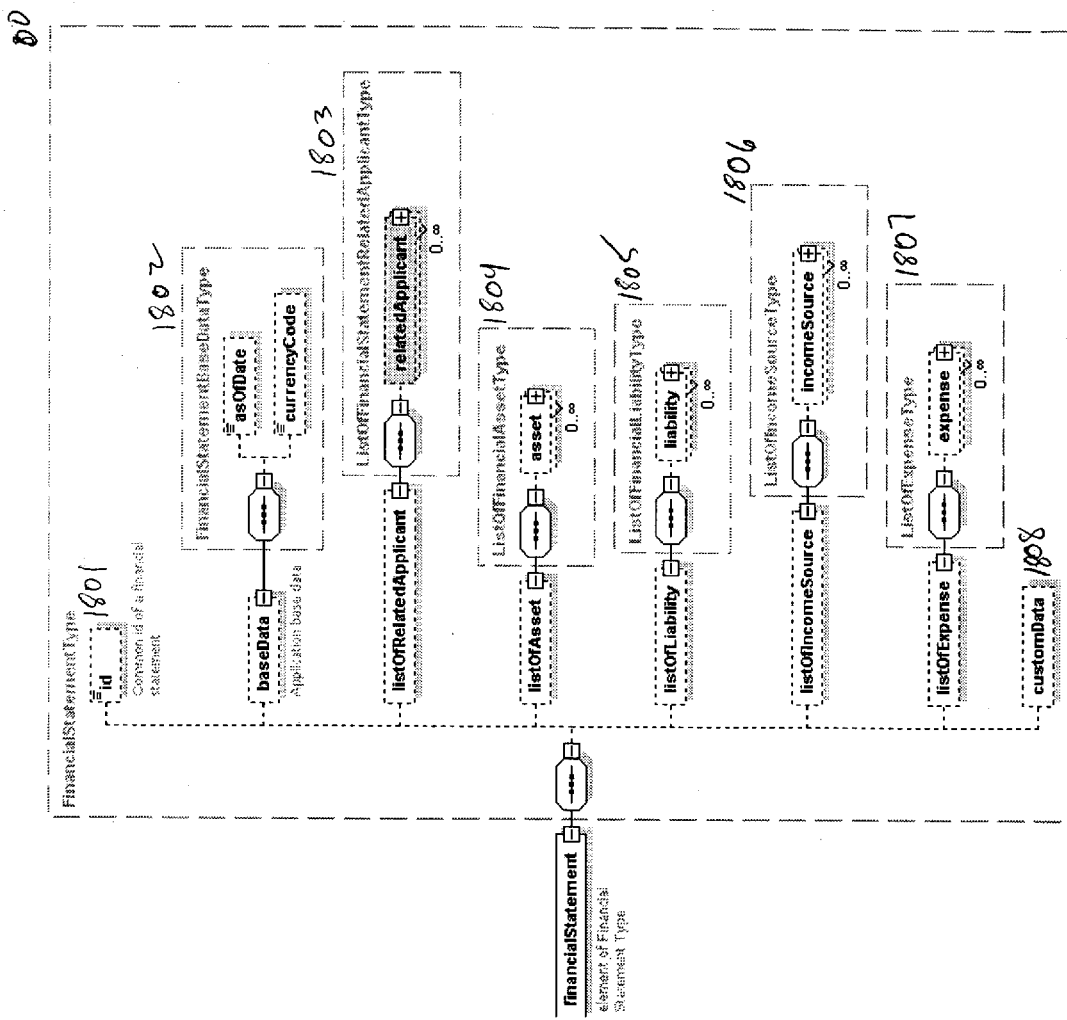
FIG. 18 is a diagram illustrating data elements of the financialStatement class in one embodiment.

FIG. 18 is a diagram illustrating data elements of the financialStatement class in one embodiment. The financialStatement class 1800 includes identifier 1801, baseData 1802, listOfRelatedApplicant 1803, listOfAsset 1804, listOfLiability 1805, listOfIncome Source 1806, listOfExpense 1807, and customData 1808 data elements. The financialStatement class thus represents assets, liabilities, income sources, and expenses of the applicants identified as related to this financial statement. The baseData data element includes an asOfDate data element that contains the effective date of the financial statement. The financial statement thus represents a snapshot of the related applicants' financial information as of that date.

Figure 19:
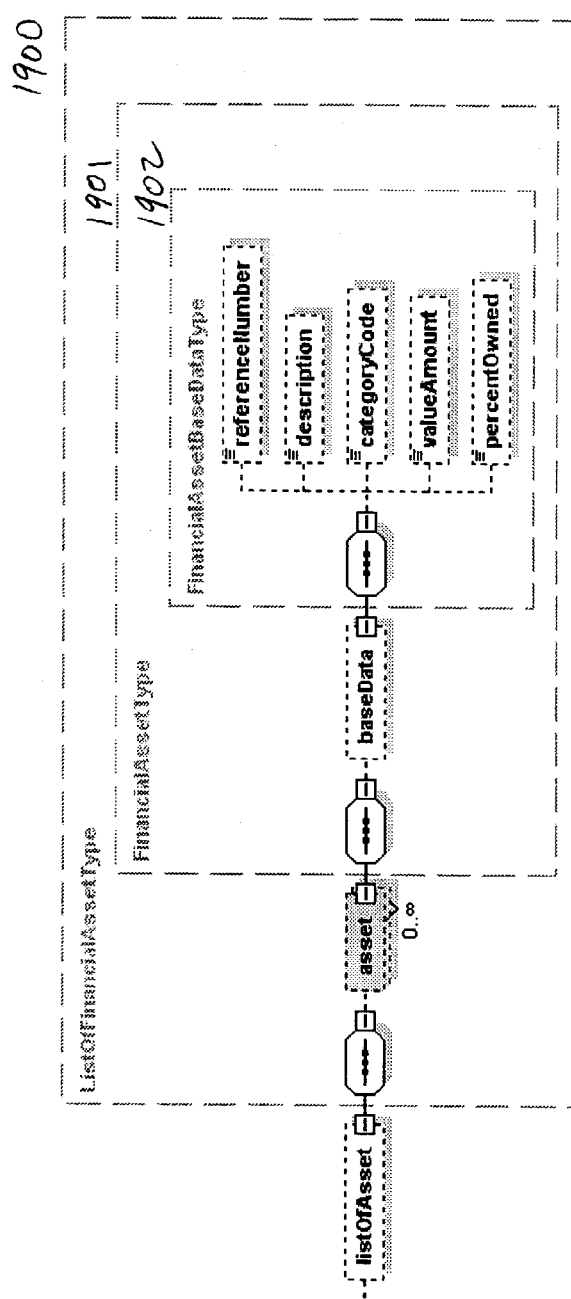
FIG. 19 is a diagram illustrating data elements of the listOfAsset class in one embodiment.

FIG. 19 is a diagram illustrating data elements of the listOfAsset class in one embodiment. The listOfAsset class 1900 optionally includes multiple asset 1901 data elements. Each asset data element includes a baseData 1902 data element that includes reference number, description, category code, value amount, and percent loan data elements. The percent loan data element indicates the percentage of this asset owned by the related applicants. For example, if the asset is a business that an applicant equally co-owns with a non-applicant, then the percent owned would be fifty percent. If the co-owner, in contrast, is listed as a related applicant on the financial statement, then the percent owned would be 100 percent. The assets may include real estate, savings, investments, and so on.

Figure 20:
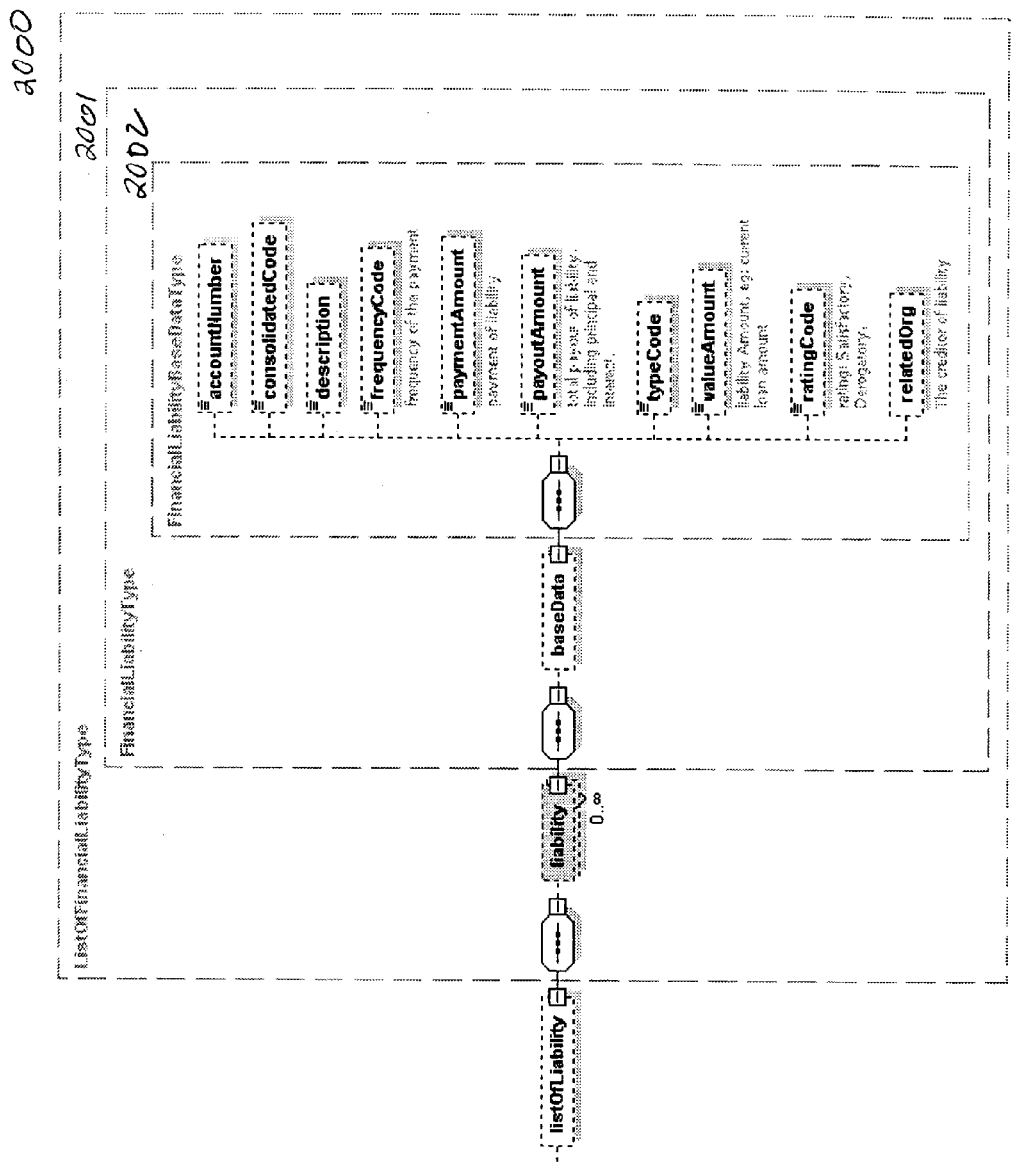
FIG. 20 is a diagram illustrating data elements of the listOfLiability class in one embodiment.

FIG. 20 is a diagram illustrating data elements of the listOfLiability class in one embodiment. The listOfLiability class 2000 optionally includes multiple liability 2001 data elements. Each instance of a liability data element corresponds to a liability (e.g., alimony and automobile loan) reported on the financial statement. The liability data element includes a baseData 2002 data element. The baseData 2002 data element includes account number, consolidated code, description, frequency code (i.e., frequency of the payment), payment amount, payout amount (i.e., total payout of liability including principal and interest), type code, value amount (e.g., current loan amount), rating code (e.g., satisfactory and derogatory), and related organization (i.e., creditor of the liability) data elements. The rating code corresponds to the rating provided by the related organization.

FIG. 21A is a diagram illustrating data elements of the listOfIncomeSource class in one embodiment. The listOfIncomeSource class 2110 optionally includes multiple incomeSource 2111 data elements. Each incomeSource data element corresponds to an income source (e.g., alimony and trust payouts) associated with the related applicants of the financial statement. The incomeSource data element includes a baseData 2112 data element. The baseData data element includes amount, frequency code, type code, and description data elements.

FIG. 21B is a diagram illustrating data elements of the listOfExpense class in one embodiment. The listOfExpense class 2121 optionally includes multiple expense 2122 data elements relating to various expenses (e.g., rent). The expense data element includes a baseData 2123 data element that contains amount, comments, description, frequency code, and type code data elements.

Figure 22:
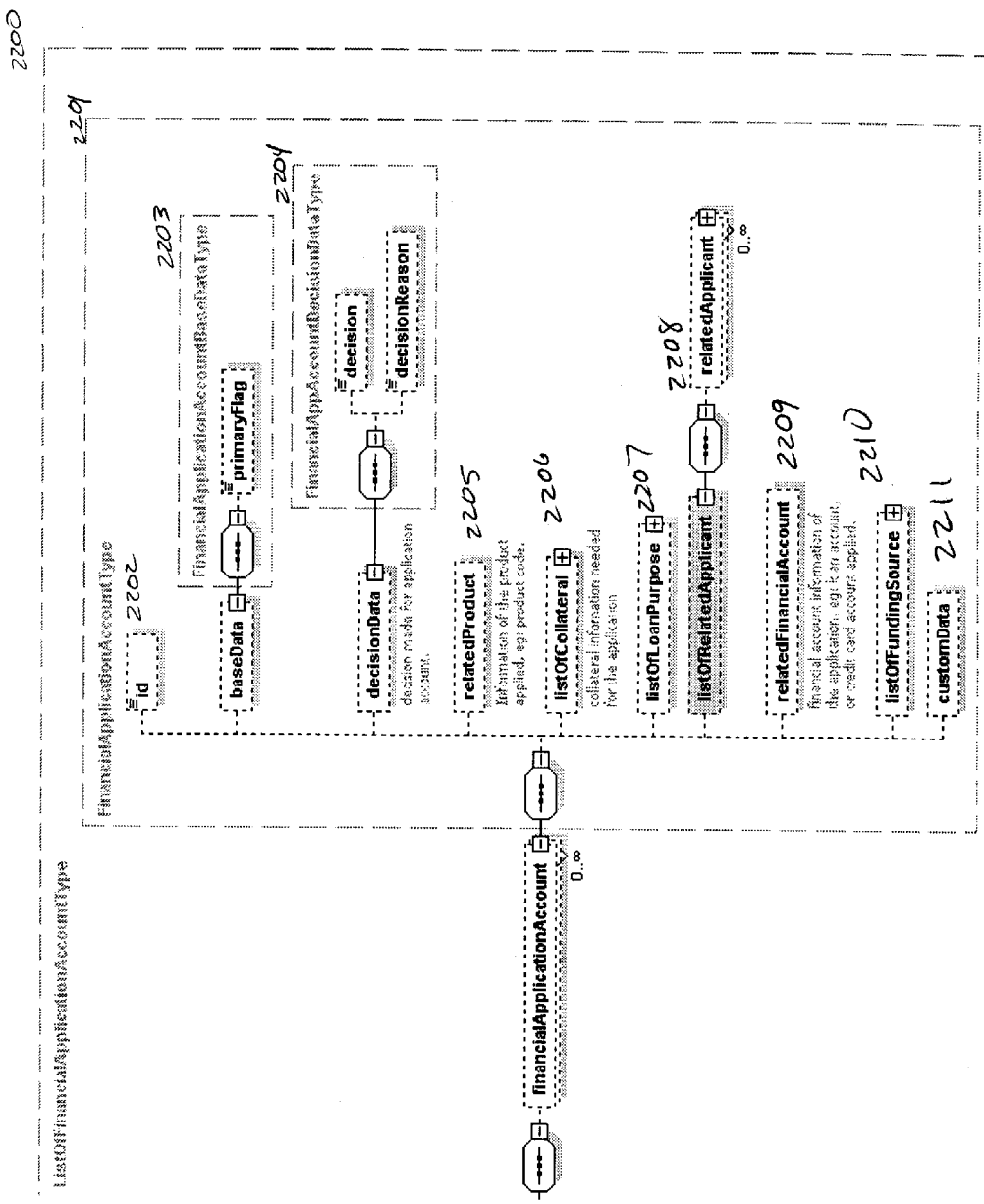
FIG. 22 is a diagram illustrating data elements of the financialApplicationAccount class in one embodiment.

FIG. 22 is a diagram illustrating data elements of the financialApplicationAccount class in one embodiment. The financialApplicationAccount class contains information (e.g., collateral description, loan purpose, and account type) for the account being applied for. The financialApplicationAccount class 2200 includes identifier 2202, baseData 2203, decisionData 2204, relatedProduct 2205, listOfCollateral 2206, listOfLoanPurpose 2207, listOfRelatedApplicant 2208, relatedFinancialAccount 2209, listOfFundingSource 2210, and customData 2211 data elements. The baseData 2203 data element includes a primaryFlag data element that indicates whether this account is the primary account associated with the application. The decisionData 2204 data element includes decision and decision reason data elements indicating the decision and reason made regarding the application account. The relatedProduct 2205 data element identifies the financial product associated with this account that is the type of account being applied for. The listOfCollateral 2206 data element identifies collateral (e.g., the vehicle that is the subject of an automobile loan) associated with the application. The listOfLoanPurpose 2207 data element lists various purposes for the loan. The listOfRelatedApplicant 2208 data element lists the applicants related to this financial application account. The relatedFinancialAccount 2209 data element identifies a potential financialAccount object to be created if this account is approved. The listOfFundingSource 2210 data element identifies the funding sources for this account (e.g., source of down payment for a mortgage account).

Figure 23:
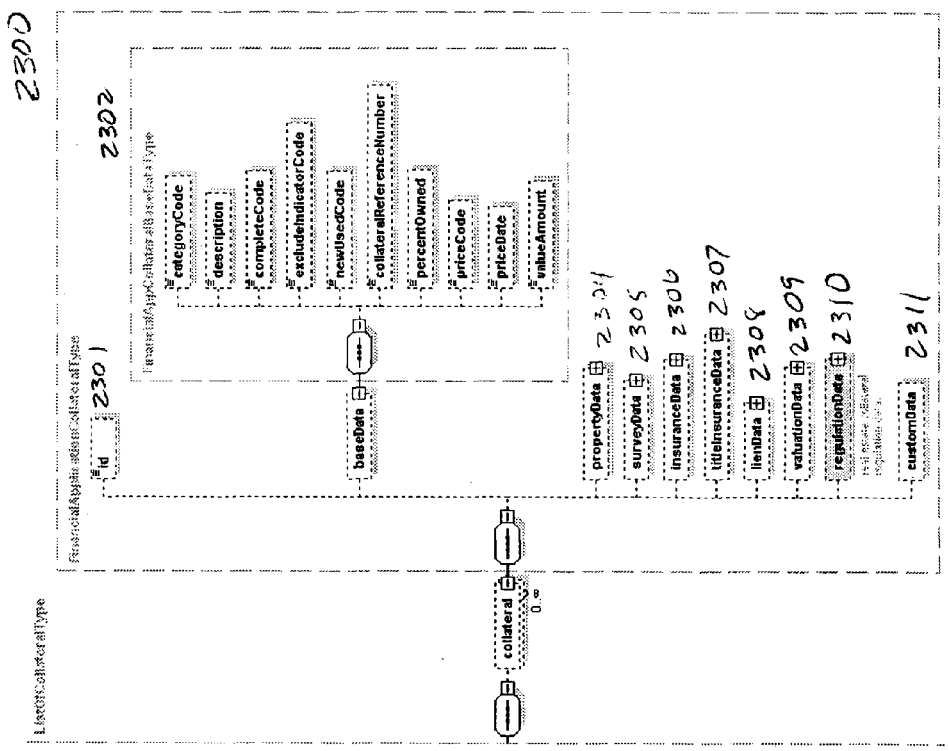
FIG. 23 is a diagram illustrating data elements of the collateral class in one embodiment.

FIG. 23 is a diagram illustrating data elements of the collateral class in one embodiment. The collateral class 2300 includes identifier 2301, baseData 2302, propertyData 2304, surveyData 2305, insuranceData 2306, titleInsuranceData 2307, lienData 2308, valuationData 2309, regulationData 2310, and customData 2311 data elements. The baseData 2302 data element includes category code, description, complete code (e.g., purchase of a custom-made boat), exclude indicator code, new used code, collateral reference number, percent owned (i.e., lending percentage of the collateral), price code, price date, and value amount data elements. The propertyData 2304 data element contains information about the property in a real estate transaction. The information includes CRA (Community Reinvestment Act) community, date purchased, lot size, number of baths, etc. The surveyData 2305 data element contains survey information and includes block number, book number, census tract, etc. The insuranceData 2306 data element includes a flood insurance flag, a flood zone indicator, insurance agent number, etc. The lienData 2308 data element includes lien holder, lien position, etc. The valuationData 2309 data element includes customer estimated value, current mortgage value, estimated annual taxes, etc. The regulationData 2310 data element includes loan type code, decision date when a decision is expected, occupancy code, etc.

Figure 24:
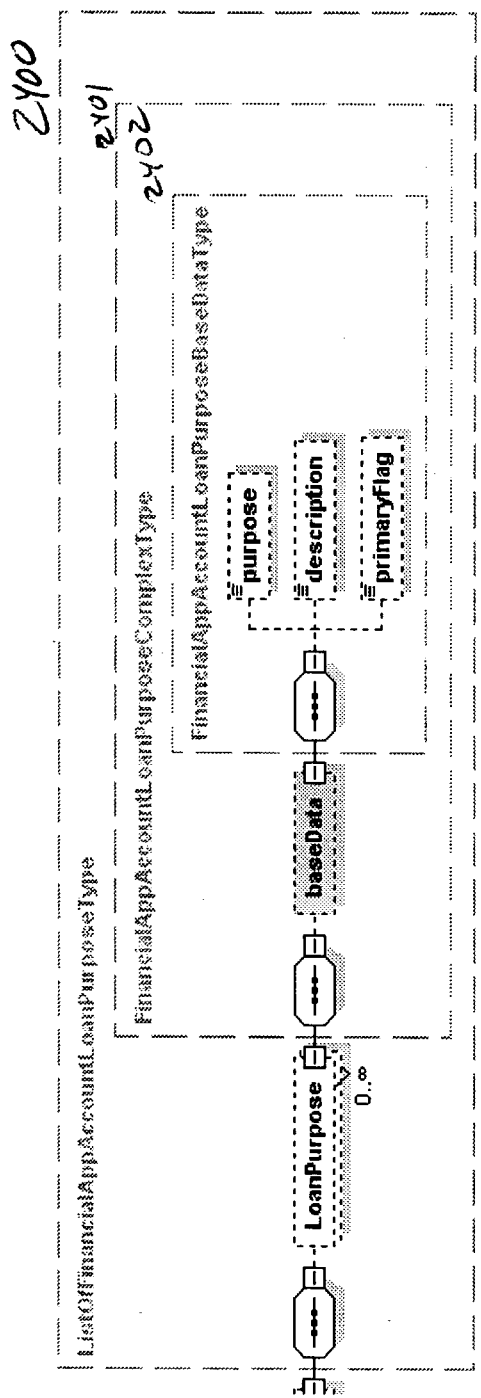
FIG. 24 is a diagram illustrating data elements of the loanPurpose class in one embodiment.

FIG. 24 is a diagram illustrating data elements of the loanPurpose class in one embodiment. The loanPurpose class 2400 includes a baseData 2402 data element. The baseData 2402 element includes purpose (e.g., remodel), description, and primary flag data elements. The primary flag data element indicates whether this purpose is the primary purpose for the loan.

Figure 25:
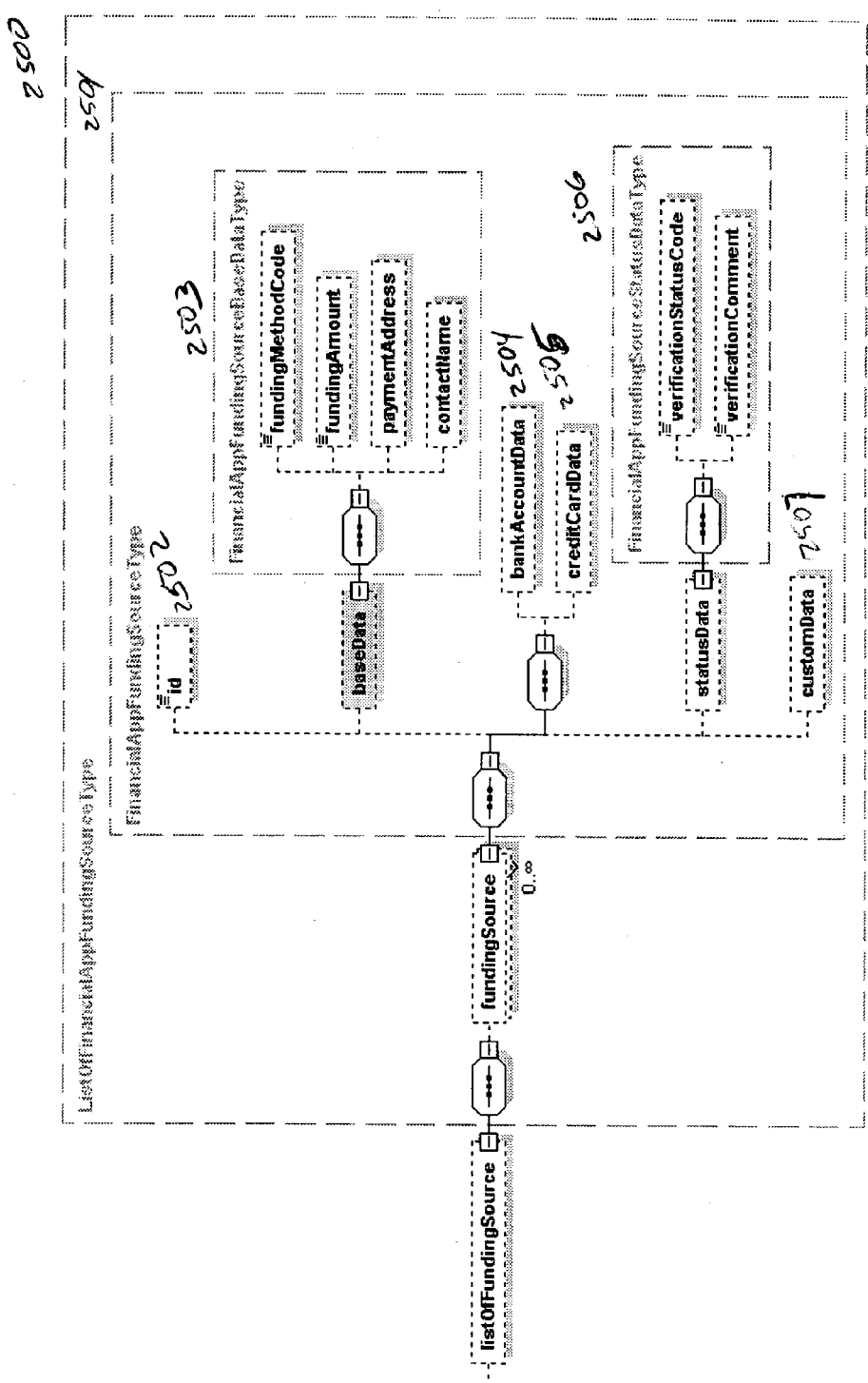
FIG. 25 is a diagram illustrating data elements of the listOfFundingSource class in one embodiment.

FIG. 25 is a diagram illustrating data elements of the listOfFundingSource class in one embodiment. The listOfFundingSource class 2500 optionally includes multiple fundingSource 2501 data elements. The fundingSource 2501 data element includes identifier 2502, baseData 2503, bankAccountData 2504 or creditCardData 2505, statusData 2506, and customData 2507 data elements. The baseData 2503 data element includes funding method code, funding amount, payment address, and contact name data elements. The statusData 2506 data element includes verification status code and verification comment data elements.

Financial Accounts

Once an application is approved, financial institutions and account holders can use a financial account data model for representing accounts in a way that allows for efficient account servicing and account inquiries. In some embodiments, the financial account data model is a flexible, multipurpose model that can be applied to almost any type of account or financial product type, including checking accounts, savings accounts, mortgage loan accounts, holding accounts, securities accounts, credit card accounts, etc. Thus, the financial account data model allows a flexible all-in-one approach for managing financial accounts. The flexible financial account data model also facilitates servicing, accessing, and aggregating a customer's financial account information.

In one embodiment, a single financial account data model applicable to multiple types of financial products including investment products, deposit products and credit products is provided. Account information that is received according to this data model corresponds to a plurality of data elements associated with the financial account data model, including a base data element for information applicable to almost any type of account. The data model also provides additional, more specialized data elements that are associated with attributes for specific financial products or groups of financial products.

Examples of some of the processes that may benefit from the financial account data model include processes associated with application processing, application status requests, fund verification requests, credit score requests, check order requests, credit score requests, fraud check requests, and credit approval requests. Other examples include processes associated with certificate of deposit service accounts, deposit service accounts, brokerage accounts, account creation, and account synchronization.

Because some financial products, such as investment products (e.g., securities) may generate the need for additional specialized data collection, various specialized data elements may be employed via the financial accounts data model. For example, with respect to securities accounts, a securities data model for representing a securities product type supported by the provided financial account data model may be provided along with the financial account data model. When a party provides account information, some of the information relating specifically to the securities account may be stored in one or more securities records which may then be accessed via the financial account record for the party.

Additionally, by making use of relationship definitions between various collaborating entities within an enterprise system (consisting of, for example, banks, credit unions, financial investment companies, credit bureaus, etc.), such entities may use the financial account data model to support the servicing of various types and instances of service accounts offered within the enterprise. For example, a customer may approach a banker and request the current balance on her checking account. The bank (i.e., front end) system locates a customer record for the customer. A bank system server then contacts an integration system server requesting summary information for each type of account (e.g., a checking account, certificate of deposits, brokerage account, etc.) the customer can hold. The integration system server then contacts appropriate external systems (i.e., back end systems) for each identified account type and requests that the external systems provide summary data. Once the external systems provide the information to the integration system server, the integration system server returns the account data to the requesting bank system server. In some embodiments, the front end (e.g., bank) system may then aggregate the account data and display the latest balance information for all of the customer's accounts on a summary view. In addition to obtaining information for the checking account, the customer can also inquire into the current balance of his CDs and brokerage accounts without the bank having to process another request.

A financial account data model may be implemented using a financialAccount class. Two classes related to the financialAccount class—a holding class and a security class—support use of the financial account data model with securities accounts and holdings. A holding is a way of associating a single stock symbol (i.e., ticker) with information on an initial buy of shares, and subsequent events that happen, such as buying additional shares, selling shares, and stock splits.

The security class comprises all of the common components of a securities account, such as productType data, securityData, and a customData component provide additional custom data attributes.

Figure 26:
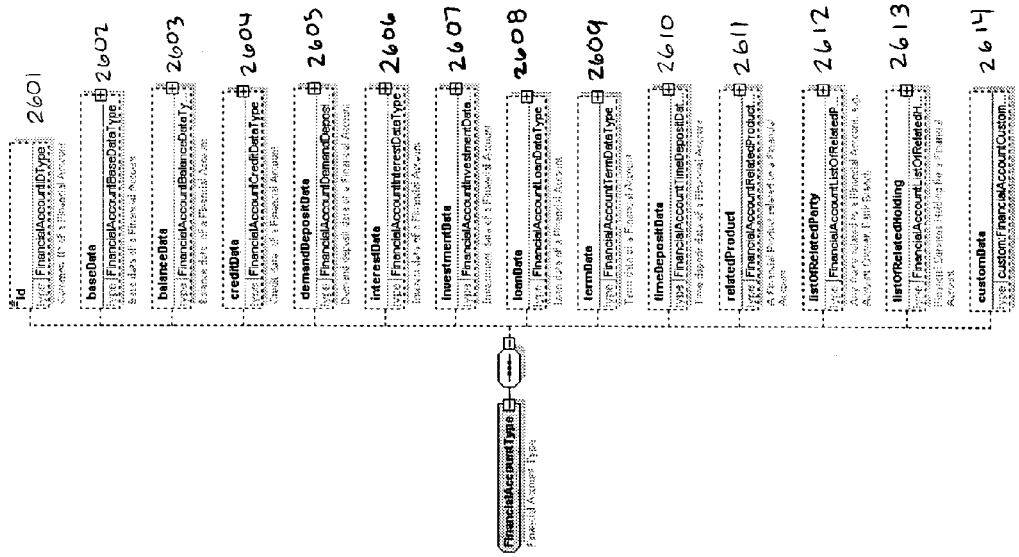
FIG. 26 illustrates the data elements of the financialAccount class in one embodiment.

FIG. 26 illustrates the highest level data elements of the financialAccount class in one embodiment. The financialAccount class inherits from a party class, a product class, a holding class, and a custom class. The highest level data elements of the financialAccount class include id 2601, baseData 2602, balanceData 2603, creditData 2604, demandDepositData 2605, interestData 2606, investmentData 2607, loanData 2608, termData 2609, timeDepositData 2610, relatedProduct 2611, relatedParty 2612, relatedHolding 2613, and customData 2614. The id element 2601 may include a unique identifier of a custom account. The customData element 2614 may include miscellaneous information regarding a customer's account, such as customer preferences. The remaining high level data elements are described in more detail below in the text accompanying FIGS. 27-37.

Figure 27:
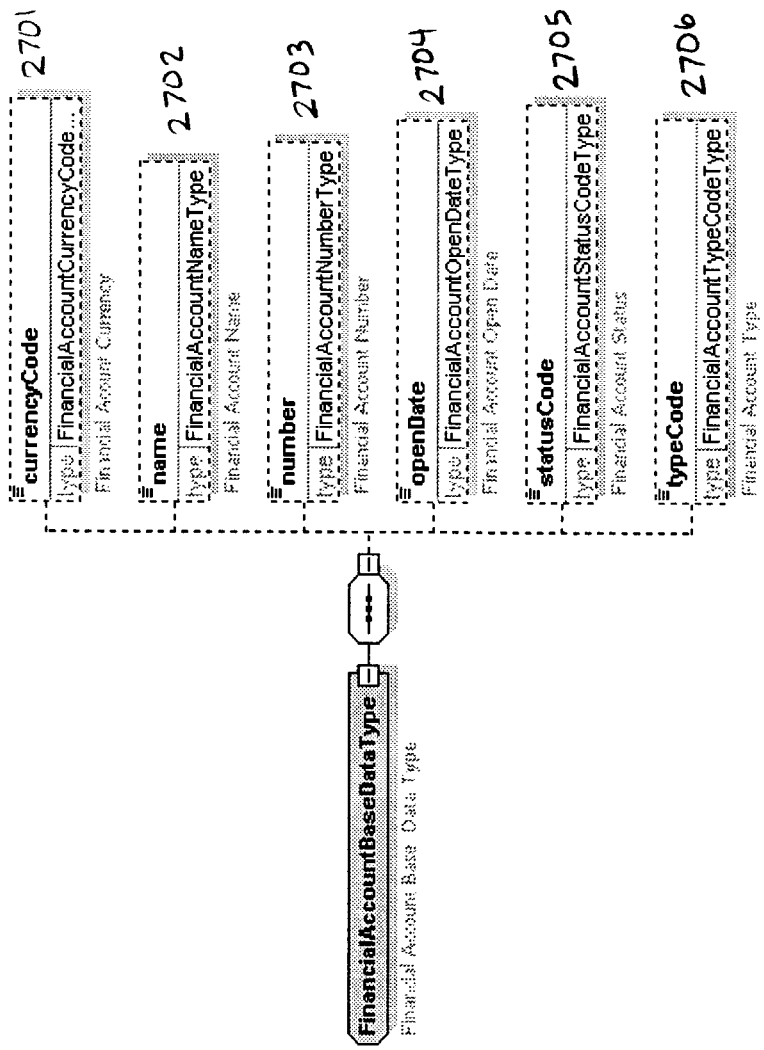
FIG. 27 illustrates the data elements of the baseData data element of the financialAccount class in one embodiment.

FIG. 27 illustrates the data elements of the baseData element 2602 of the financialAccount class in one embodiment. The baseData elements include currencyCode 2701 (e.g., US, CA, etc.), account name 2702 (e.g., personal checking), account number 2703, openDate 2704 (i.e., date account was opened), statusCode 2705 and typeCode 2706.

Figure 28:
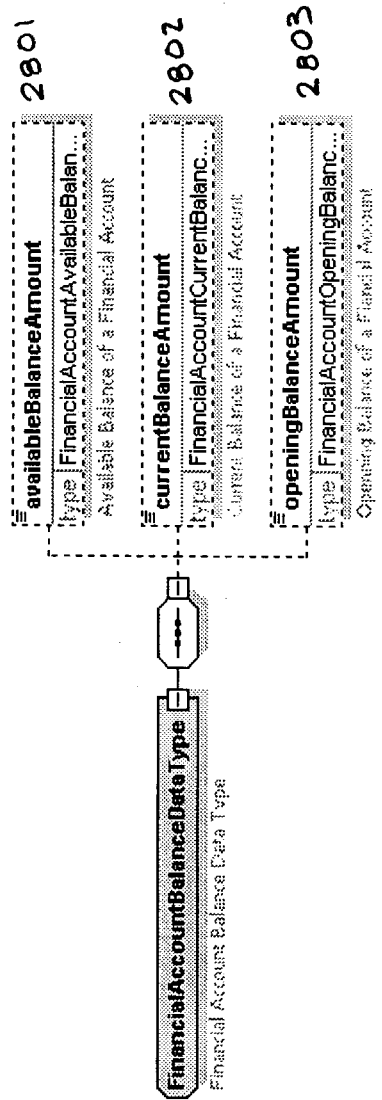
FIG. 28 illustrates the data elements of the balanceData data element of the financialAccount class in one embodiment.

FIG. 28 illustrates the data elements of the balanceData element 2603 of the financialAccount class in one embodiment. The balanceData elements relate to the balance information for the account and include availableBalanceAmount 2801, currentBalanceAmount 2802, and openingBalanceAmount 2803.

Figure 29:
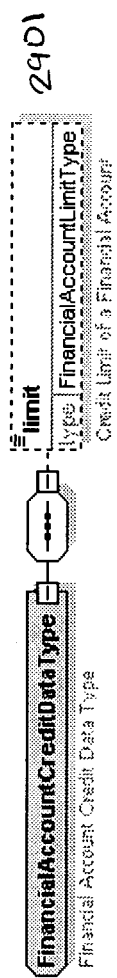
FIG. 29 illustrates the data elements of the creditData data element of the financialAccount class in one embodiment.

FIG. 29 illustrates the data elements of the creditData element 2604 of the financialAccount class in one embodiment. The creditData elements include a limit element 2901 that can be used to indicate the account's limit, for example, in the case of a credit card account.

Figure 30:
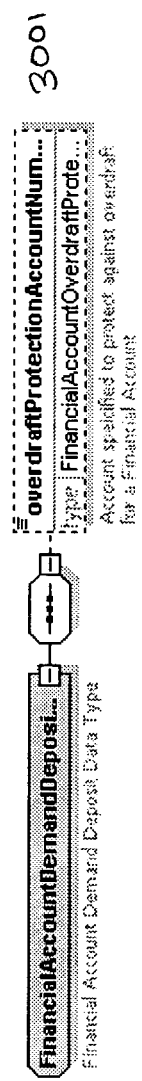
FIG. 30 illustrates the data elements of the demandDeposit data element of the financialAccount class in one embodiment.

FIG. 30 illustrates the data elements of the demandDeposit element 2605 of the financialAccount class in one embodiment. The demandDeposit element includes an overdraftProtectionAccountNumber 3001 data element, which refers to the account number that a customer indicates as providing overdraft protection in case the account referred to exceeds its limit, as specified, for example, in creditData limit element 2901.

Figure 31:
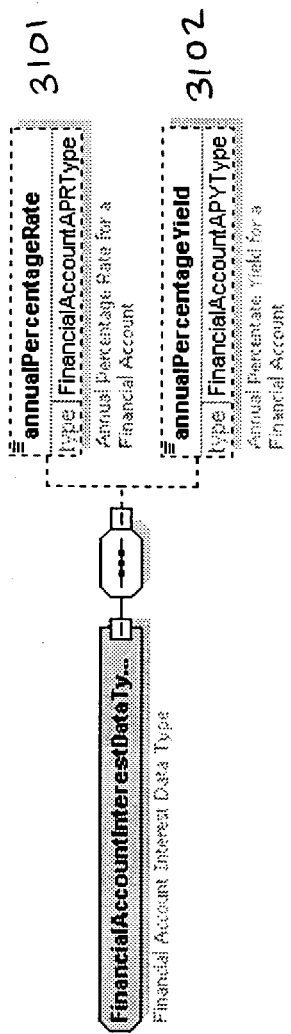
FIG. 31 illustrates the data elements of the interestData data element of the financialAccount class in one embodiment.

FIG. 31 illustrates the data elements of the interestData element 2606 of the financialAccount class in one embodiment. The interestData elements include annualPercentageRate 3101 and annualPercentageYield 3102.

Figure 32:
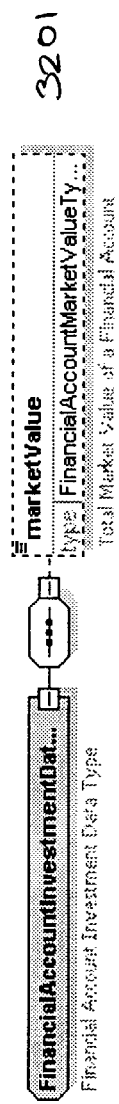
FIG. 32 illustrates the data elements of the investmentData data element of the financialAccount class in one embodiment.

FIG. 32 illustrates the data elements of the investmentData element 2607 of the financialAccount class in one embodiment. The investmentData element includes a marketValue element 3201. This element provides a total market value for the account.

Figure 33:
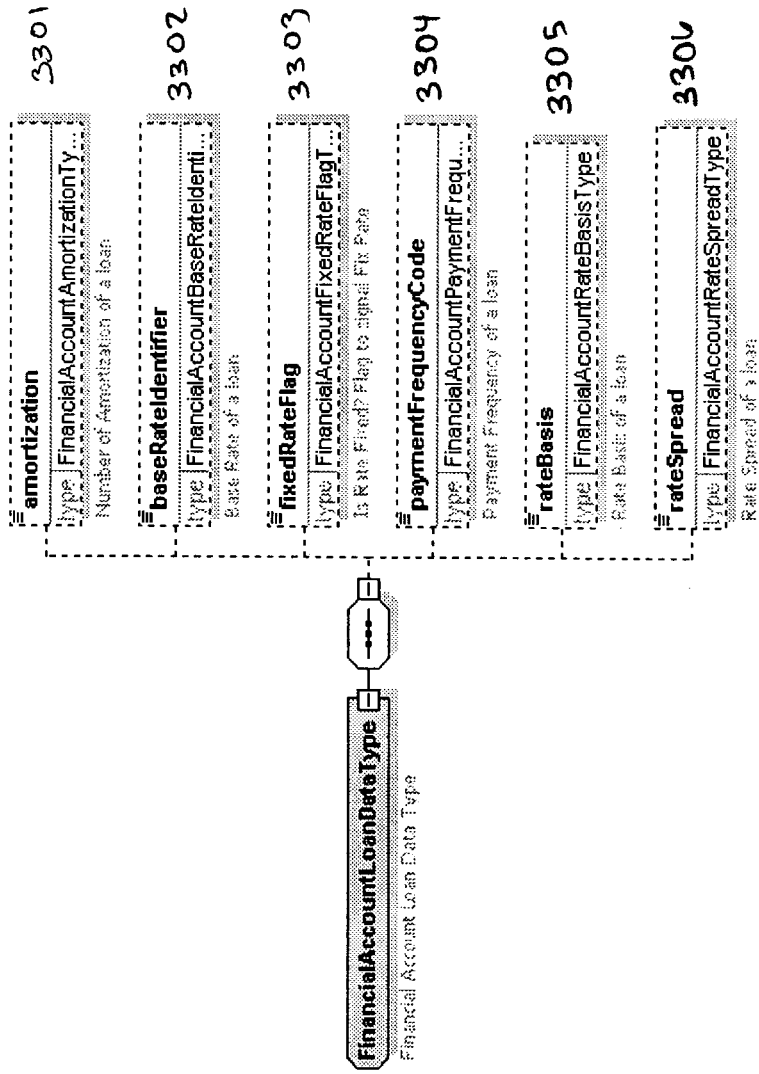
FIG. 33 illustrates the data elements of the loanData data element of the financialAccount class in one embodiment.

FIG. 33 illustrates the data elements of the loanData element 2608 of the financialAccount class in one embodiment. The loanData elements include amortization 3301, baseRateIdentifier 3302, fixedRateFlag 3303 (indicates whether loan rate is fixed), paymentFrequencyCode 3304, rateBasis 3305, and rateSpread 3306.

Figure 34:
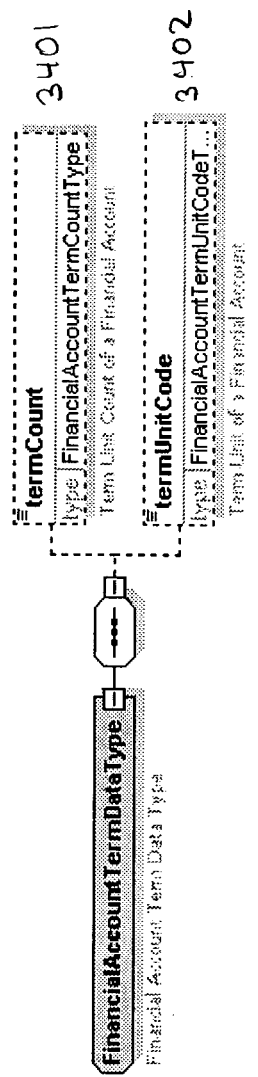
FIG. 34 illustrates the data elements of the termData data element of the financialAccount class in one embodiment.

FIG. 34 illustrates the data elements of the termData element 2609 of the financialAccount class in one embodiment. The termData elements include termCount 3401 and termUnitCode 3402. These elements relate to the investment attributes of a financial account.

Figure 35:
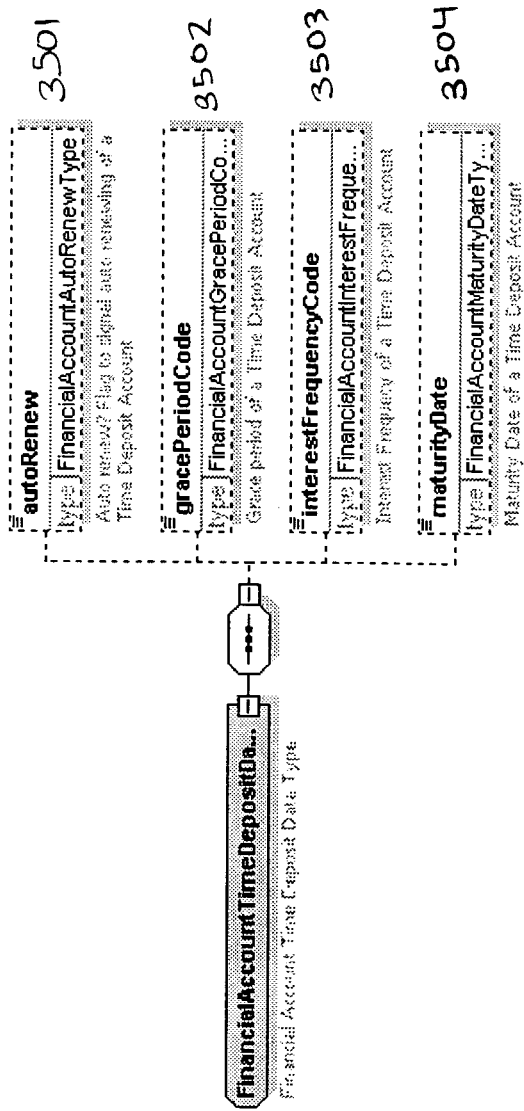
FIG. 35 illustrates the data elements of timeDeposit data element of the financialAccount class in one embodiment.

FIG. 35 illustrates the data elements of the timeDeposit element 2610 of the financialAccount class in one embodiment. The timeDeposit elements include autoRenew 3501, gracePeriodCode 3502, interestFrequencyCode 3503, and maturityDate 3504.

Figure 36:
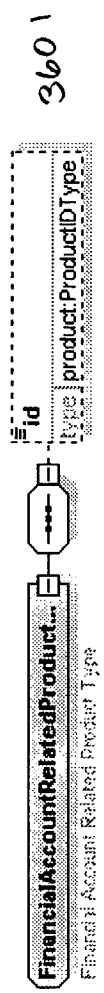
FIG. 36 illustrates the data elements of relatedProduct data element of the financialAccount class in one embodiment.

FIG. 36 illustrates the data elements of the relatedProduct element 2611 of the financialAccount class in one embodiment. Financial products can include various accounts, securities, and holdings. The relatedProduct elements include id 3601, which refers to the ID number of a particular product related to the account, such as another type of account or holding.

Figure 37:
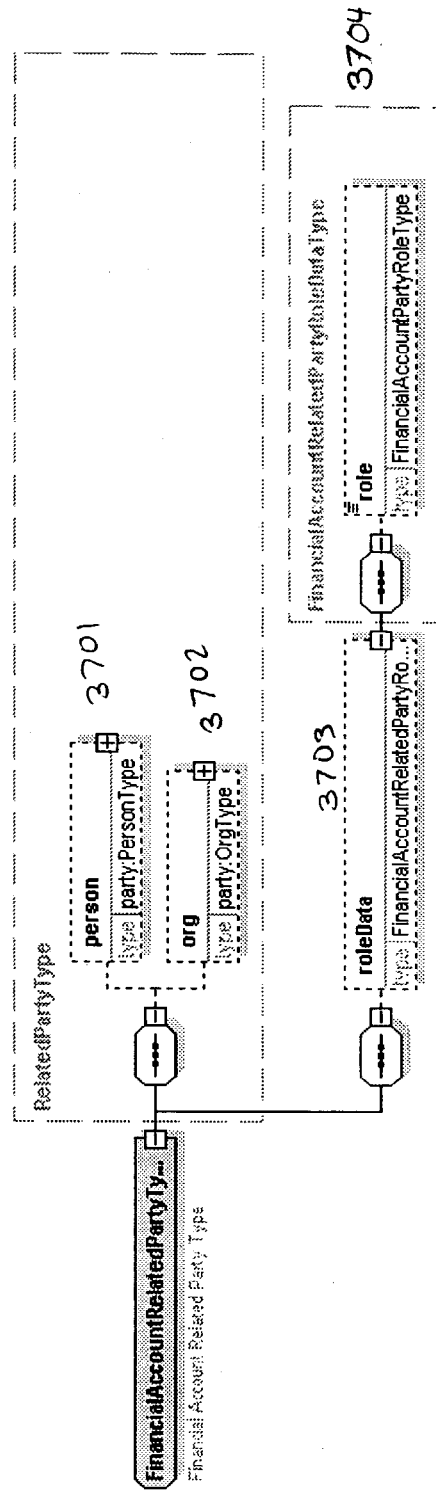
FIG. 37 illustrates the data elements of relatedParty data element of the financialAccount class in one embodiment.

FIG. 37 illustrates the data elements of the relatedParty element 2612 of the financialAccount class in one embodiment. The relatedParty elements include person 3701, organization 3702, and roleData 3703. The 3701 and 3702 data elements refer to the person or organization related to the account, such as a guarantor or other related party. Their role is indicated by the roleData element 3703.

Figure 38:
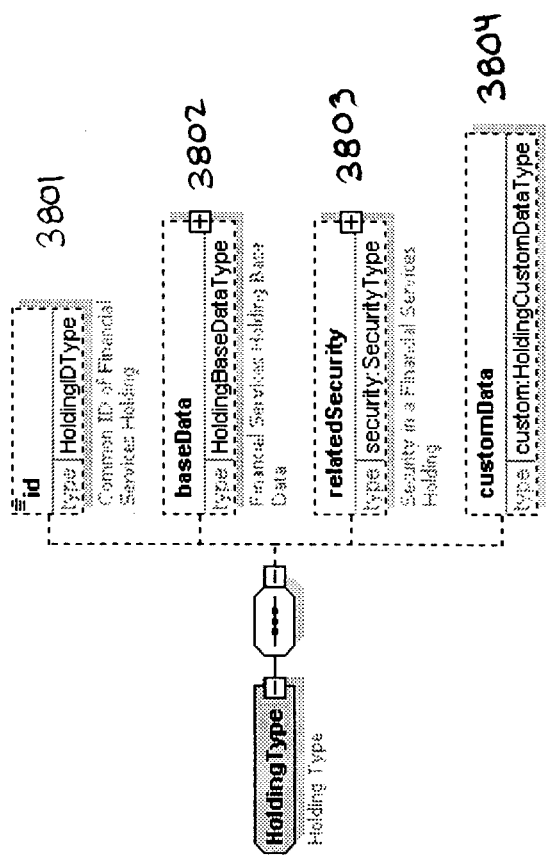
FIG. 38 illustrates the data elements of the holding class in one embodiment.
Figure 39:
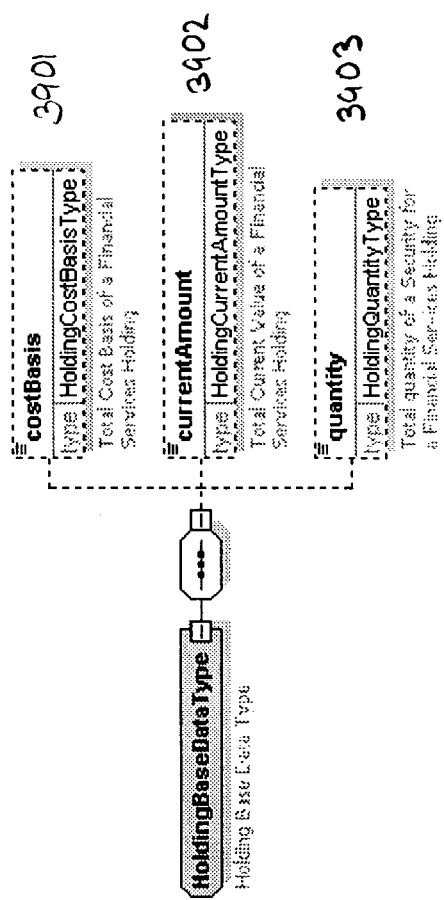
FIG. 39 illustrates the data elements of the baseData data element of the holding class in one embodiment.

The holding class and the security class support use of the financialAccount class for securities and holding accounts. FIG. 38 illustrates the highest level data elements of a holding class in one embodiment. The holding class inherits from the common class, a security class, and the custom class. The highest level data elements of the holding class include idData 3801, baseData 3802, relatedSecurity 3803, and customData 3804. As with the financialAccount class, the idData element 3801 may be a unique identifier of a customer's holding account. The customData element 3804 may include miscellaneous information regarding the holding account, such as customer preferences, etc. In one embodiment, the baseData element 3802 may include various elements, as illustrated in FIG. 39. In one embodiment, the baseData elements may include costBasis 3901 (i.e., total cost basis of a financial services holding), currentAmount 3902 (i.e., total current value of a financial services holding), and quantity 3903 (e.g., "fifty shares").

Figure 40:
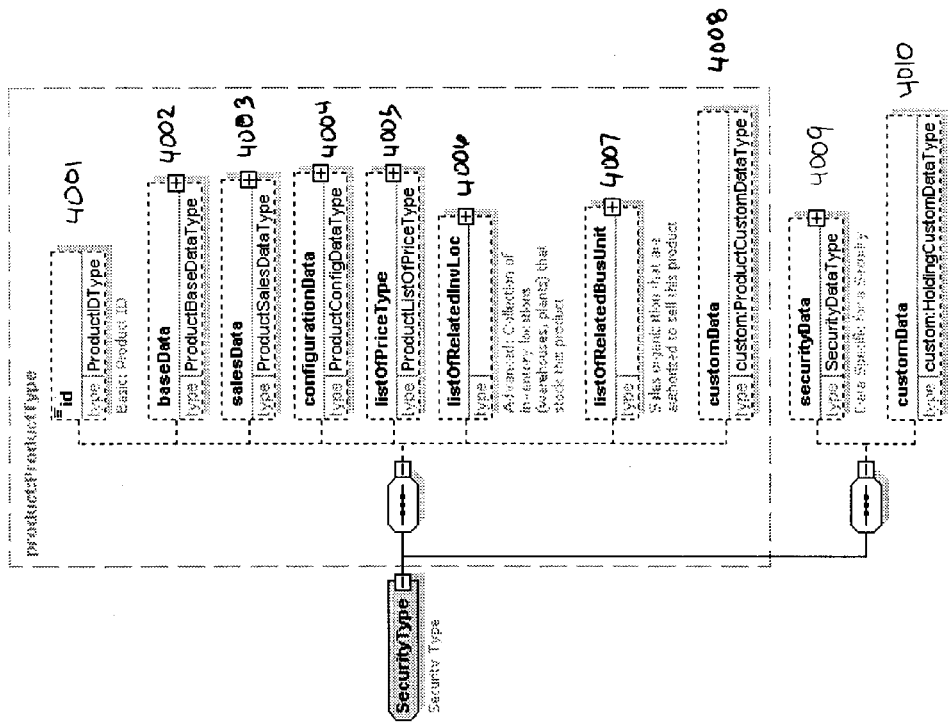
FIG. 40 illustrates the data elements of the security class in one embodiment.

FIG. 40 illustrates the highest level data elements of the security class in one embodiment. The highest level data elements include idData 4001, baseData 4002, salesData 4003, configurationData 4004, priceType 4005, relatedinvoiceLocation 4006, relatedBusinessUnit 4007, and customData 4008. Additionally, two data element types related to the security class include securityData 4009 and customData 4010. The securityData element 4009 is shown in further detail in FIG. 41.

Figure 41:
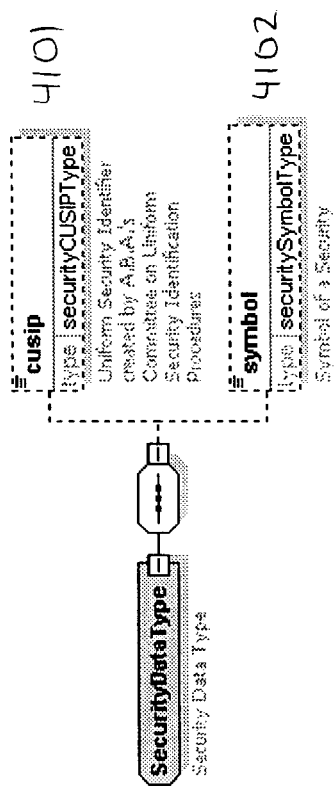
FIG. 41 illustrates the data elements of the securityData data element of the security class in one embodiment.

FIG. 41 illustrates the data elements of the securityData element 4009 related to the financialAccount class in one embodiment. The securityData element includes a cusip element 4101, which serves as a uniform security identifier for a particular security, and a symbol element 4102, which identifies a unique security via a symbol.

Credit Bureau Reports

A credit bureau report data model can be used in various processes to determine whether particular financial products (e.g., loans and lines of credit) are available to a customer based on that customer's financial history. Examples of such processes include requesting credit approval, requesting a credit score, or requesting a fraud check (i.e., whether a customer has a record including fraud). These processes can be used to provide information to both individual customers (e.g., "What is my credit rating?") and to organizations offering services or financial products (e.g., "How much risk is involved with this customer?"). For example, a phone company may desire to evaluate a phone service applicant's credit score. Once the phone company requests this information, the relevant information can be provided using a class implementation of the credit bureau report data model and its associated data elements (e.g., using "baseData," "creditData," and "relatedParty"). If the applicant's retrieved credit score is low and the risk associated with the applicant is high, the phone company may then, for example, require the customer to pay a deposit before phone service is provided.

In another example, an auto loan company may desire to evaluate an auto loan applicant's credit profile and request a credit report from a consumer credit bureau. As a result of a process using the credit bureau report data model, the auto loan company can acquire information such as payment histories for each of the applicant's credit accounts, as well as a credit score. Depending on the history of the applicant's various accounts (e.g., one Visa credit card account with no past due history, and another store card account with one three-month past due record), the auto loan company can determine, for example, the appropriate interest rate, down payment required, and payment plan.

Information relating to an individual's credit is typically collected in some form by institutions such as credit bureaus. Accordingly, in one embodiment, the credit bureau report data model can be used to match credit data provided by multiple credit bureaus and other organizations. It can also be used to support both historic data and analytical data. For example, in some embodiments credit information for a party is requested from external sources, including at least one credit bureau. When the requested credit information is received, the external sources, it is then stored in a credit bureau report record. The credit bureau report record may include a credit score and a credit history for the party. In this way, front end system may access a credit history for a party by retrieving static raw data from various back end systems, such as credit bureau systems, then analyzing and summarizing this raw data. The credit bureau report data model is easily extendible to support additional credit report-related processes.

Additional data that can be associated with the credit bureau report data model includes information relating to credit inquiries made by various organizations or individuals. For example, via an inquiry field, information relating to inquiry dates, types, and inquiring organizations can be indicated.

In some embodiments, information about credit-related fraudulent activities may be provided using the credit bureau report data model. For example, in some embodiments, information relating to an individual's fraudulent activities (e.g., reporting a credit card stolen to avoid paying charges) may be retrieved from court records, credit bureaus, etc., and may be provided using various data elements relating to fraud (e.g., fraud date, fraud type, comments, etc.). When provided with this type of comprehensive credit and fraud information, an entity inquiring into an applicant's credit can acquire complete information to make informed decisions, thereby reducing risk.

Figure 42:
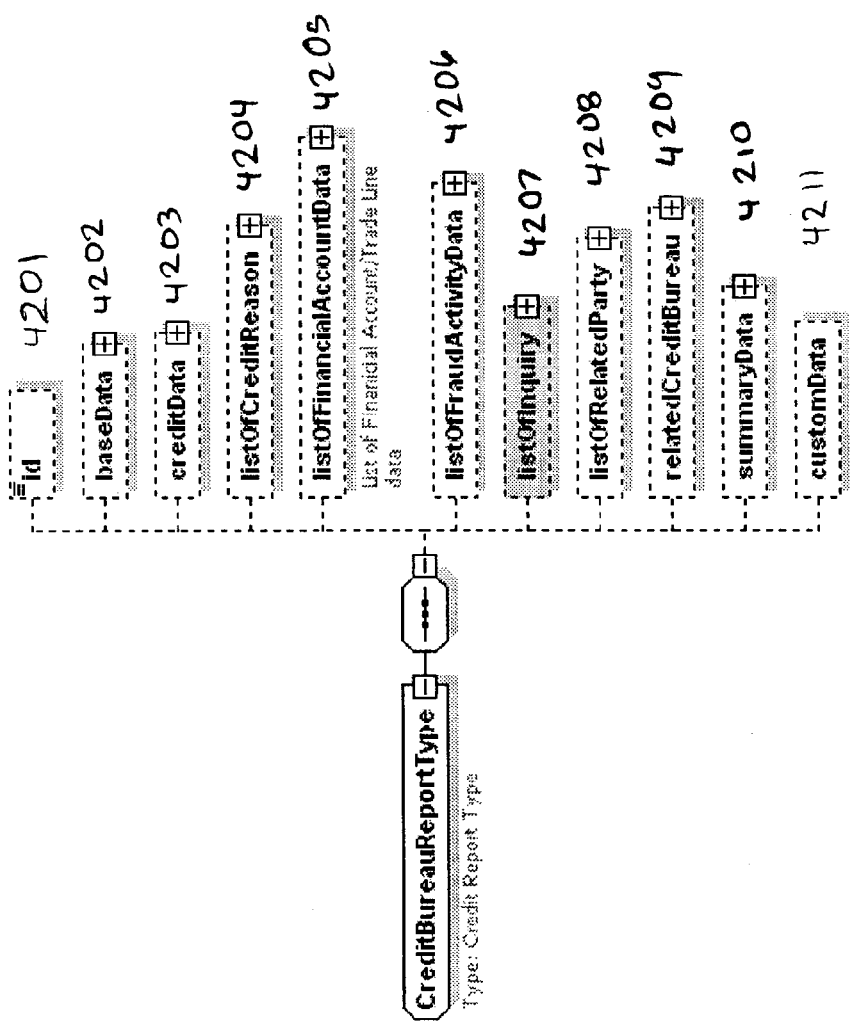
FIG. 42 illustrates the data elements of the creditBureauReport class in one embodiment.

FIG. 42 illustrates the highest level data elements of a creditBureauReport class used to implement a credit bureau report data model in one embodiment. The creditBureauReport class inherits from the party class, the financialAccount class, the common class, a paymentMethod class, and the custom class. The highest level data elements of the creditBureauReport class include idData 4201, baseData 4202, creditData 4203, creditReason 4204, financialAccountData 4205, fraudActivityData 4206, inquiry 4207, relatedParty 4208, creditBureau 4209, summaryData 4210, and customData 4211.

Figure 43:
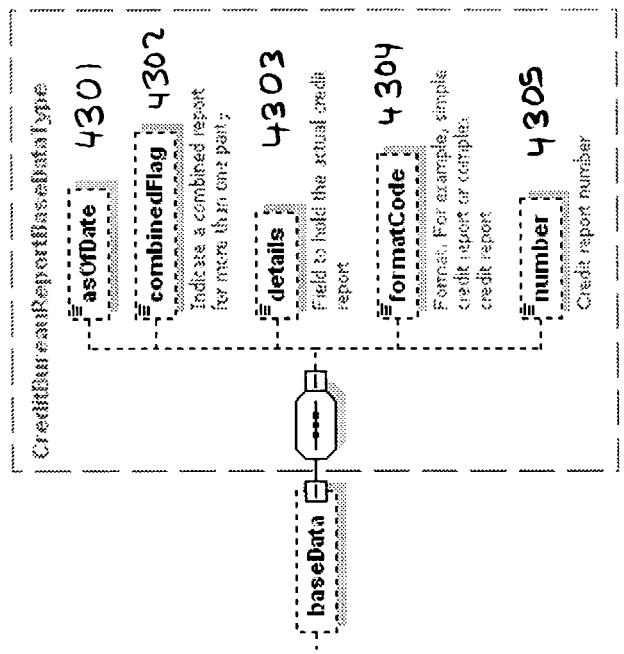
FIG. 43 illustrates the data elements of the baseData data element of the creditBureauReport class in one embodiment.

FIG. 43 illustrates the data elements of the baseData element of the creditBureauReport class in one embodiment. The baseData element includes asOfDate 4301, combinedFlag 4302, details 4303, formatcode 4304, and number 4305. The asOfDate element 4301 refers to the date that the information was submitted or relates back to. The combinedFlag element 4302 indicates a combined report for more than one party (i.e., joint credit report). For example, as described above with respect to the application class, a husband and wife may share financial accounts. In such a case, a joint credit report is useful to describe their credit history. The details element 4303 is a field that holds the actual credit report. The formatCode element 4304 provides information related to the format of the report (e.g., simple credit report or complex credit report). The number element 4305 refers to the credit report number.

Figure 44:
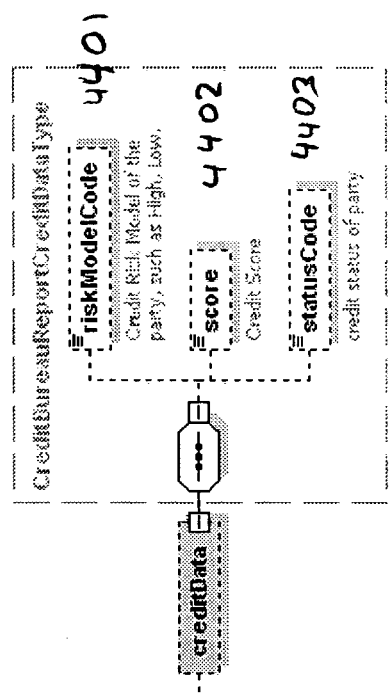
FIG. 44 illustrates the data elements of the creditData data element of the creditBureauReport class in one embodiment.

FIG. 44 illustrates the data elements of the creditData element of the creditBureauReport class in one embodiment. The creditData element includes riskModelCode 4401, score 4402, and statusCode 4403 elements. The riskModelCode element 4401 shows the credit risk associated with the report (e.g., high, low, etc.). The score element 4402 refers to the overall credit score associated with the report. The statusCode element 4403 refers to the status credit of the party.

Figure 45:
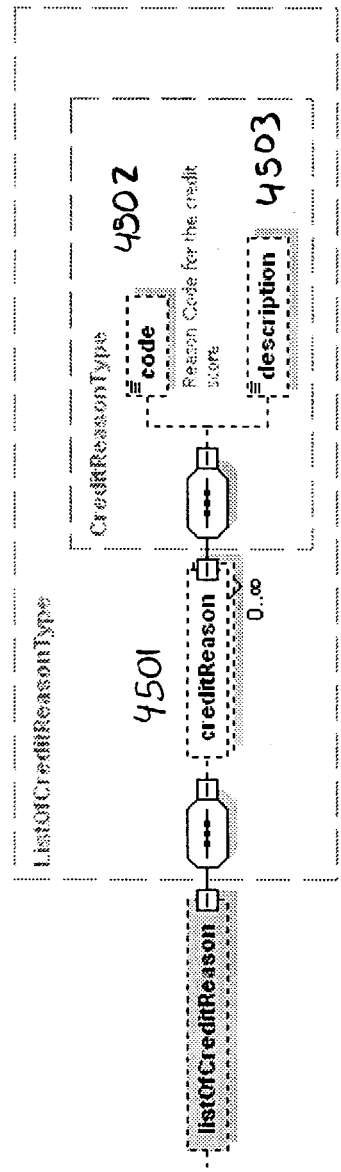
FIG. 45 illustrates the data elements of the creditReason data element of the creditBureauReport class in one embodiment.

FIG. 45 illustrates the data elements of the creditReason element of the creditBureauReport class in one embodiment. The creditReason element includes creditReason 4501, which in turn has two additional elements, code 4502 and description 4503. These two elements function to describe details associated with a credit score or rating.

Figure 46:
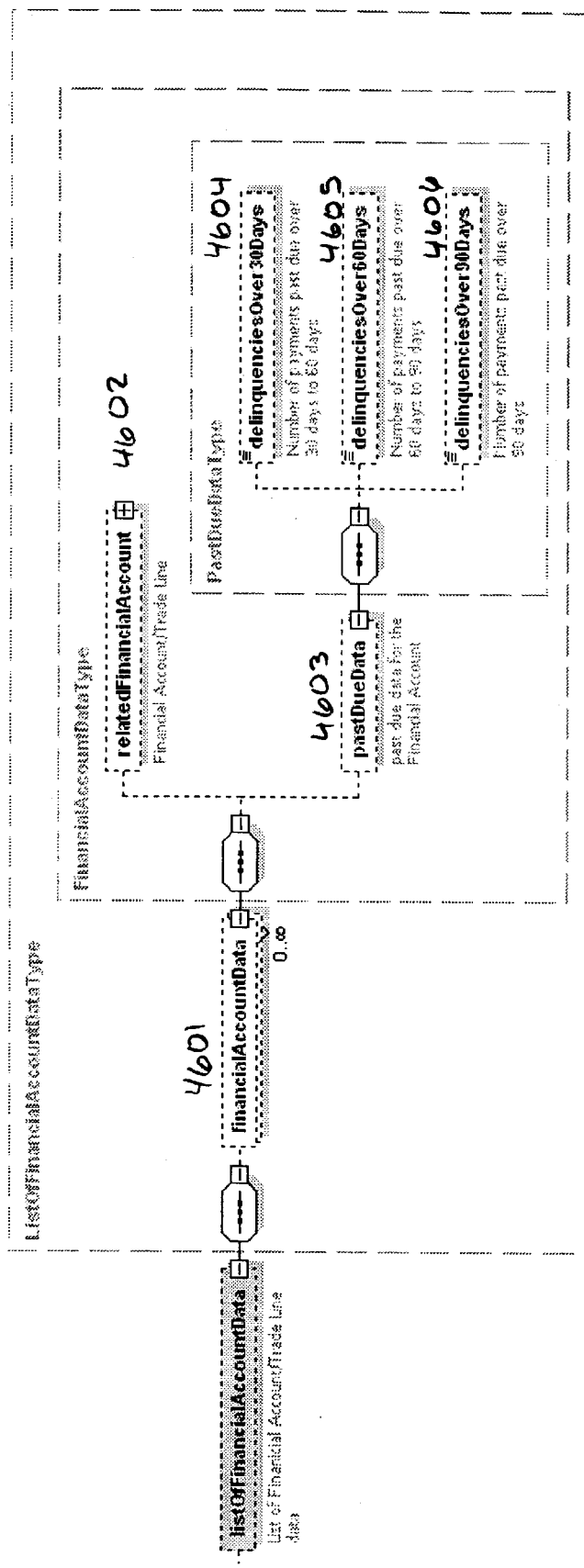
FIG. 46 illustrates the data elements of the financialAccountData data element of the creditBureauReport class in one embodiment.

FIG. 46 illustrates the data elements of the listOfFinancialAccountData element of the creditBureauReport class in one embodiment. The listOfFinancialAccountData section may contain credit historic data for all financial account information related to a customer's credit report and may have one or more financialAccountData elements 4601 for each individual financial account related to the credit report. In turn, each financialAccountData element 4601 will include data elements such as relatedFinancialAccount 4602 and pastDueData 4603. Data elements associated with the pastDueData element include delinquenciesOver30Days 4604, delinquenciesOver60Days 4605, and delinquenciesOver90Days 4606 (i.e., divided into three categories based on past due length).

Figure 47:
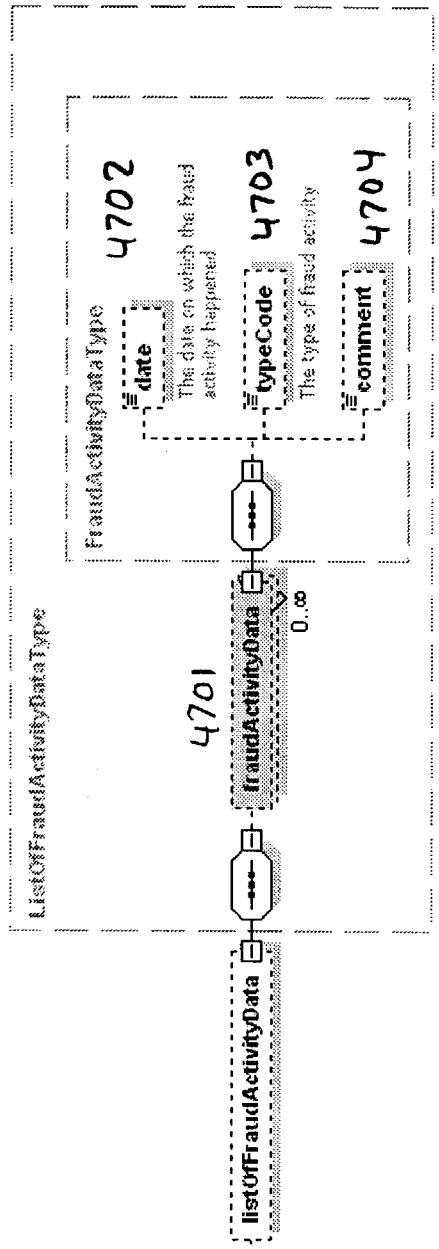
FIG. 47 illustrates the fraudActivity data element of the creditBureauReport class in one embodiment.

FIG. 47 illustrates the data elements of the listOfFraudActivityData element of the creditBureauReport class in one embodiment. The listOfFraudActivityData element may include a fraudActivityData element 4701 for each instance of fraud associated with a CreditBureauReport. In turn, each instance of fraud can be associated with its own elements including date 4702, typeCode 4703, and comment 4704. The date element 4702 refers to the date on which the fraud activity happened. The typeCode element 4703 refers to a code indicating the type of fraud activity. The comment element 4704 is a field that holds comments related to the fraudulent activity (e.g., explaining the circumstances).

Figure 48:
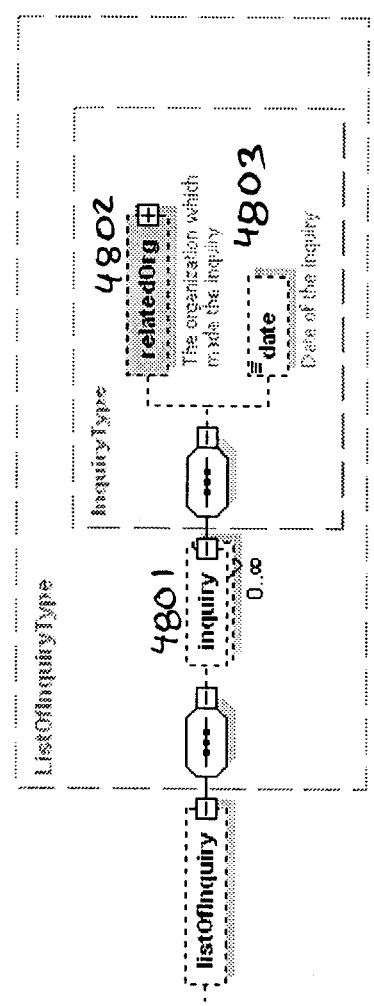
FIG. 48 illustrates the inquiryType data element of the creditBureauReport class in one embodiment.

FIG. 48 illustrates the data elements of the listOfInquiry element of the creditBureauReport class in one embodiment. For each inquiry 4801 related to the CreditBureauReport, a relatedOrg element 4802 and a date element 4803 may be included. The relatedOrg element 4802 refers to the organization that made the inquiry. The date element 4803 refers to the date of the inquiry.

Figure 49:
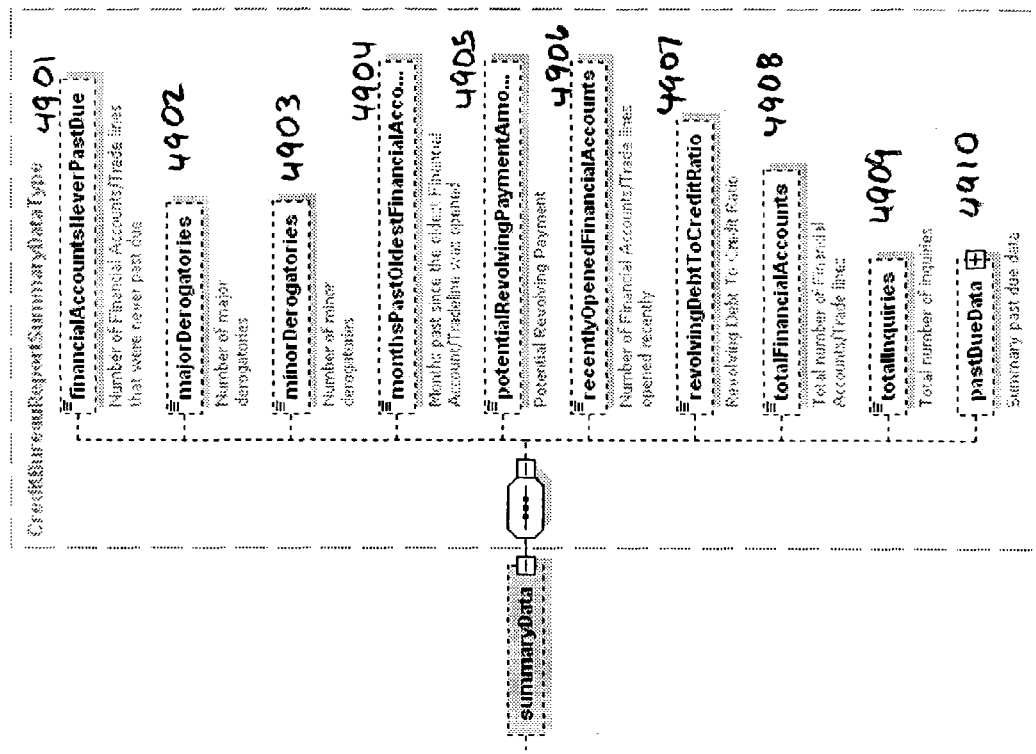
FIG. 49 illustrates the summaryData data element of the creditBureauReport class in one embodiment.

FIG. 49 illustrates the data elements of the summaryData element 4210 of the creditBureauReport class in one embodiment. The information in the summary data section may include both raw data provided from back end systems (e.g., credit bureaus) and analytical data reflecting aggregate information and summaries. The summaryData data elements include financialAccountsNeverPastDue 4901, majorDerogatories 4902, minorDerogatories 4903, monthsPastOldestFinancialAccount 4904, potentialRevolvingPaymentAmount 4905, recentlyopenedFinancialAccounts 4906, revolvingDebtToCreditRatio 4907, totalFinancialAccounts 4908, totalInquiries 4909, and pastDueData 4910.

The financialAccountsNeverPastDue element 4901 indicates the number of financial accounts/trade lines that were never past due. The majorDerogatories element 4902 indicates the number of major derogatories (e.g., failure to make payments, etc.) related to the CreditBureauReport. Similarly, the minorDerogatories element 4903 indicates the number of minor derogatories associated with the CreditBureauReport.

The monthsPastOldestFinancialAccount element 4904 indicates the number of months since the oldest financial account/trade line was opened. The potentialRevolvingPaymentAmount element 4905 indicates potential revolving payment options, providing an estimate of a maximum allowable account balance. The recentlyOpenedFinancialAccounts element 4906 indicates the number of financial accounts/trade lines recently opened (e.g., opened within sixty days) by the customer associated with the CreditBureauReport. The revolvingDebtToCreditRatio element 4907 indicates the revolving debt-to-credit ratio associated with the CreditBureauReport. The totalFinancialAccounts element 4908 indicates the total number of financial accounts/trade lines associated with the CreditBureauReport. The totalInquiries element 4909 indicates the total number of inquiries associated with the CreditBureauReport. The pastDueData element 4910 summarizes any past due data associated with the CreditBureauReport.

From the foregoing, it will be appreciated that although specific embodiments of the technology have been described herein for purposes of illustration, various modifications may be made without deviating from the spirit and scope of the invention. For example, the class definitions that have been described using XML schema can be equivalently described using other class definition tools, such as a C++ class. The classes described can be instantiated in memory and be initialized with information. Accordingly, the invention is not limited except by the appended claims.

We claim:

1. A method in a computer system, the method comprising:
providing, by a computer processor of the computer system, a plurality of financial statement records for a plurality of parties, wherein
  each financial statement record among the plurality of financial statement records is identified by a respective party identifier of a plurality of party identifiers, and
  each of the party identifiers corresponds to a respective one of the parties;
receiving, by the computer processor, a request to open at least one financial account,
  wherein
  the request is received from a party of the plurality of parties,
  the request comprises application data for the party,
  the application data conforms to a financial application data model,
  the application data comprises
    application data for at least one primary financial account and at least one dependent financial account,
  the party comprises a plurality of applicants,
  fewer than all of the plurality of applicants are associated with the at least one primary financial account and the at least one dependent financial account, and
  the request is evaluated by a financial institution;
instantiating, by the computer processor, a financial application object in accordance with
  the financial application data model, wherein
  the financial application object is associated with the party, and
  the financial application object comprises
    the application data, and
    respective ones of the plurality of financial statement records associated with at least a subset of the plurality of applicants;
if the financial institution approves the at least one primary financial account,
  approving the request, wherein
  the approving is performed by the financial institution, and
  the approving comprises
    accessing the financial application object, and
    referencing the financial account data model in the financial application object; and
if the financial institution rejects the at least one primary financial account,
  rejecting the request, by the computer processor,
  wherein
  the rejecting is performed by the financial institution, and
  the rejecting comprises
    accessing the financial application object, and
    rejecting each applicant of the plurality of applicants within the party,
    wherein
      the rejecting is based, at least in part, on the application data.

2. The method of claim 1, wherein the method further comprises:
identifying, by the computer processor, a party identifier associated with a financial application record, wherein
  the party identifier associated with the financial application record identifies the party;
storing, by the computer processor, the financial application record, wherein
  the financial application record corresponds to the received request,
  the storing comprises
    storing the application data, and
    storing the party identifier associated with the financial application record, and
  the storing allows the financial application record to be associated with multiple financial statements for the party;
providing, by the computer processor, the financial application record to the financial institution;
in response to a determination that the request is approved by the financial institution, receiving, by the computer processor, approval information from the financial institution; and
in response to receiving approval information, generating, by the computer processor, and presenting, by the computer processor, at least one account associated with the application.

3. The method of claim 2, wherein
the financial application record comprises information related to potential financial accounts; and further comprising
requesting the financial application record, wherein
  the requesting is performed by a second computer system, and
  the requesting requests the financial application record from the computer system; and
providing a response message to the second computer system, wherein
  the response message comprises
    the financial application record,
    one or more of the potential financial accounts related to the financial application record, and
    the one or more of the potential financial accounts are selected based on being related to the financial application record.

4. The method of claim 1, wherein the financial application data model comprises a base data element, an applicant list data element, and a financial statement list data element.

5. The method of claim 1, wherein
the financial application data model comprises an account application list data element,
the financial application data model is configured to allow at least two of the plurality of applicants in the party to apply for multiple accounts using a single application,
the multiple accounts comprise a plurality of different account types, and
the account application list data element of the financial application data model is further configured to allow each of the at least two of the plurality of applicants to apply for a different one of the plurality of different account types.

6. The method of claim 1, wherein
the financial statement records comprises information that is updated over time, and
the updated information is available via the financial application record.

7. The method of claim 1, wherein
the each of the party identifiers is included in a party class, and
the party class comprises a list of relationships of the respective one of the parties corresponding to the each of the party identifiers.

8. A method in a computer system, the method comprising:
creating, by a computer processor of the computer system, a customer relationship for a party of a plurality of parties, wherein
    each of the plurality of parties is associated with at least one of a plurality of financial statement records,
    the creating comprises
        creating party objects for the plurality of parties,
        identifying a plurality of customer relationships between the plurality of parties, and
        for each of the plurality of parties, performing a relationship building process,
    the relationship building process comprises
        selecting a first party of the plurality of parties,
        selecting a second party of the plurality of parties, and
        adding to a party object of the first party an identification value of the second party,
    a customer relationship exists between the first party and the second party, and
    the customer relationship is one of the plurality of customer relationships;
receiving, by the computer processor of the computer system, a request to open at least one financial account, wherein
    the request is received from the first party,
    the request comprises application data for the first party,
    the application data conforms to a financial application data model,
    the request is evaluated by a financial institution;
instantiating, by the computer processor of the computer system, a financial application object in accordance with the financial application data model, wherein
    the financial application object is associated with the first party, and
    the financial application object comprises
        the application data, and
        one or more of the plurality of financial statement records that are identified using an identification value of the first party;
if the financial institution approves the at least one financial account, approving the request, wherein
    the approving is performed by the financial institution, and
    the approving comprises
        accessing the financial application object, and
        referencing the financial account data model in the financial application object; and
if the financial institution rejects the at least one financial account, rejecting the request, by the computer processor, wherein
    the rejecting is performed by the financial institution, and
    the rejecting comprises
        accessing the financial application object, and
        rejecting the first party, wherein
            the rejecting is based, at least in part, on the application data.

9. The method of claim 1, further comprising:
creating the at least one primary financial account and the at least one dependent financial account, if the financial institution approves the at least one primary financial account, wherein
    the creating comprises
        associating the at least one primary financial account and the at least one dependent financial account with the financial account object.

\* \* \* \* \*

UNITED STATES PATENT AND TRADEMARK OFFICE
CERTIFICATE OF CORRECTION

PATENT NO.        : 8,538,840 B2
APPLICATION NO.   : 10/434533
DATED             : September 17, 2013
INVENTOR(S)       : Chan et al.

Page 1 of 1

It is certified that error appears in the above-identified patent and that said Letters Patent is hereby corrected as shown below:

On title page 3, column 1, Item [56] under other publications, line 15, delete "Conventry:" and insert -- Coventry: --, therefor.

On title page 3, column 1, Item [56] under other publications, line 17, delete "Intervia," and insert -- Interavia, --, therefor.

On title page 3, column 2, Item [56] under other publications, line 21, delete "SML" and insert -- XML --, therefor.

In the Specifications

In column 1, line 58, delete "addition" and insert -- addition, --, therefor.

In column 7, line 49, delete "annual Revenue" and insert -- annualRevenue --, therefor.

In column 17, line 50, delete "formatcode" and insert -- formatCode --, therefor.

Signed and Sealed this
Seventeenth Day of December, 2013

Margaret A. Focarino
*Commissioner for Patents of the United States Patent and Trademark Office*